United States Patent
Hendler et al.

(10) Patent No.: US 12,484,835 B2
(45) Date of Patent: Dec. 2, 2025

(54) METHOD AND SYSTEM FOR USE IN MONITORING NEURAL ACTIVITY IN A SUBJECT'S BRAIN

(71) Applicant: The Medical Research, Infrastructure and Health Services Fund of the Tel Aviv Medical Center, Tel-Aviv (IL)

(72) Inventors: Talma Hendler, Tel-Aviv (IL); Nathan Intrator, Tel-Aviv (IL); Ilana Klovatch, Petach-Tikva (IL); Sivan Kinreih, Ramat-Efal (IL); Yehudit Meir-Hasson, Rehovot (IL)

(73) Assignee: The Medical Research, Infrastructure and Health Services Fund of the Tel Aviv Medical Center, Tel-Aviv (IL)

( * ) Notice: Subject to any disclaimer, the term of this patent is extended or adjusted under 35 U.S.C. 154(b) by 181 days.

(21) Appl. No.: 17/100,990

(22) Filed: Nov. 23, 2020

(65) Prior Publication Data

US 2021/0169395 A1    Jun. 10, 2021

Related U.S. Application Data

(63) Continuation of application No. 13/983,419, filed as application No. PCT/IL2012/050036 on Feb. 2, 2012, now Pat. No. 10,893,822.
(Continued)

(51) Int. Cl.
*A61B 5/375* (2021.01)
*A61B 5/00* (2006.01)
(Continued)

(52) U.S. Cl.
CPC ............ *A61B 5/375* (2021.01); *A61B 5/0042* (2013.01); *A61B 5/0095* (2013.01);
(Continued)

(58) Field of Classification Search
CPC ... A61B 5/0482; A61B 5/0042; A61B 5/0095; A61B 5/0261; A61B 5/04008;
(Continued)

(56) References Cited

U.S. PATENT DOCUMENTS

| 7,865,235 B2 | 1/2011 | Le et al. |
| 7,974,787 B2 | 7/2011 | Hyde et al. |

(Continued)

FOREIGN PATENT DOCUMENTS

| CN | 106267514 | 1/2017 |
| CN | 107463792 | 12/2017 |

(Continued)

OTHER PUBLICATIONS

Babiloni, Fabio, et al. "Estimation of the cortical functional connectivity with the multimodal integration of high-resolution EEG and fMRI data by directed transfer function." Neuroimage 24.1 (2005): 118-131 (Year: 2005).*

(Continued)

*Primary Examiner* — Amanda L Steinberg

(57) ABSTRACT

A system and method are presented for use in monitoring brain activity of a subject. The system comprises a control unit which comprises: a data input utility for receiving measured data comprising data corresponding to signals measured during a certain time period and being indicative of a subject's brain activity originated from locations in the subject's brain during said certain time period, and a processor utility which is configured and operable for processing the measured data and generating data indicative thereof in the form of a multi-parameter function presenting a relation between frequency and time data of the measured signals and for analyzing said relation and identifying a subject-related signature corresponding to the subject's brain neural activity.

24 Claims, 8 Drawing Sheets
(3 of 8 Drawing Sheet(s) Filed in Color)

Related U.S. Application Data

(60) Provisional application No. 61/438,996, filed on Feb. 3, 2011.

(51) Int. Cl.
*A61B 5/026* (2006.01)
*A61B 5/055* (2006.01)
*A61B 5/245* (2021.01)
*A61B 5/291* (2021.01)
*A61B 5/316* (2021.01)
*A61B 5/369* (2021.01)
*A61B 6/03* (2006.01)
*A61B 6/50* (2024.01)
*A61B 8/08* (2006.01)
*G01R 33/46* (2006.01)
*G01R 33/48* (2006.01)

(52) U.S. Cl.
CPC ............ *A61B 5/0261* (2013.01); *A61B 5/055* (2013.01); *A61B 5/245* (2021.01); *A61B 5/291* (2021.01); *A61B 5/316* (2021.01); *A61B 5/369* (2021.01); *A61B 6/032* (2013.01); *A61B 6/037* (2013.01); *A61B 6/501* (2013.01); *A61B 8/0808* (2013.01); *G01R 33/46* (2013.01); *G01R 33/4806* (2013.01)

(58) Field of Classification Search
CPC . A61B 5/04012; A61B 5/0476; A61B 5/0478; A61B 5/055; A61B 6/032; A61B 6/037; A61B 6/501; A61B 8/0808; G01R 33/46; G01R 33/4806
See application file for complete search history.

(56) References Cited

U.S. PATENT DOCUMENTS

| | | | |
|---|---|---|---|
| 10,893,822 | B2 | 1/2021 | Hendler et al. |
| 11,400,289 | B2 | 8/2022 | Alyagon |
| 2003/0229122 | A1 | 12/2003 | Wiig et al. |
| 2007/0135728 | A1 | 6/2007 | Snyder |
| 2007/0188710 | A1* | 8/2007 | Hetling .................. A61B 5/398 351/221 |
| 2008/0249430 | A1* | 10/2008 | John ....................... A61B 5/375 600/544 |
| 2009/0030303 | A1 | 1/2009 | Pradeep et al. |
| 2009/0069707 | A1 | 3/2009 | Sandford |
| 2009/0292180 | A1 | 11/2009 | Mirow |
| 2009/0297000 | A1 | 12/2009 | Shahaf et al. |
| 2010/0016752 | A1 | 1/2010 | Sieracki |
| 2010/0145215 | A1* | 6/2010 | Pradeep ............... A61B 5/4035 600/546 |
| 2011/0028827 | A1 | 2/2011 | Sitaram et al. |
| 2011/0263968 | A1* | 10/2011 | Quattrocki-Knight ..................... A61B 6/037 424/9.1 |
| 2011/0307029 | A1 | 12/2011 | Hargrove |
| 2012/0041355 | A1 | 2/2012 | Edman et al. |
| 2012/0060851 | A1 | 3/2012 | Amberg |
| 2012/0239000 | A1 | 9/2012 | Han |
| 2012/0296569 | A1* | 11/2012 | Shahaf ................... A61B 5/383 702/19 |
| 2014/0058189 | A1 | 2/2014 | Stubbeman |
| 2014/0148657 | A1 | 5/2014 | Hendler et al. |
| 2014/0343143 | A1 | 11/2014 | Bruzzese |
| 2014/0364721 | A1 | 12/2014 | Lee et al. |
| 2015/0011907 | A1 | 1/2015 | Purdon et al. |
| 2017/0071495 | A1 | 3/2017 | Denison et al. |
| 2018/0064902 | A1 | 3/2018 | Brewer et al. |
| 2019/0159715 | A1 | 5/2019 | Mishra Ramanathan |
| 2019/0329063 | A1 | 10/2019 | Hendler et al. |
| 2020/0168117 | A1 | 5/2020 | P.M. Firouzabadi |
| 2021/0259615 | A1 | 8/2021 | Hendler et al. |
| 2021/0290132 | A1 | 9/2021 | Hendler et al. |
| 2023/0123617 | A1 | 4/2023 | Hendler et al. |

FOREIGN PATENT DOCUMENTS

| | | |
|---|---|---|
| CN | 108578871 | 9/2018 |
| CN | 108784692 | 11/2018 |
| CN | 111068159 | 4/2020 |
| EP | 2670299 | 12/2013 |
| JP | 2008-246053 | 10/2008 |
| JP | 2013-99392 | 5/2013 |
| KR | 20160020017 | 2/2016 |
| WO | WO 2006/021952 | 3/2006 |
| WO | WO 2009/063463 | 5/2009 |
| WO | WO 2010/127044 | 11/2010 |
| WO | WO 2012/104853 | 8/2012 |
| WO | WO 2018/026710 | 2/2018 |
| WO | WO 2018/071426 | 4/2018 |
| WO | WO 2018/107181 | 6/2018 |
| WO | WO 2018/116250 | 6/2018 |
| WO | WO 2020/100144 | 5/2020 |
| WO | WO 2020/121299 | 6/2020 |
| WO | WO 2021/260697 | 12/2021 |
| WO | WO 2024/038452 | 2/2024 |
| WO | WO 2024/127404 | 6/2024 |

OTHER PUBLICATIONS

Applicant-Initiated Interview Summary Dated Jan. 19, 2017 From the US Patent and Trademark Office Re. U.S. Appl. No. 13/983,419. (2 pages).
Communication Pursuant to Article 94(3) EPC Dated Dec. 16, 2019 From the European Patent Office Re. Application No. 12741756.6. (5 Pages).
International Preliminary Report on Patentability Dated Aug. 15, 2013 From the International Bureau of WIPO Re. Application No. PCT/IL2012/050036. (19 Pages).
International Search Report and the Written Opinion Dated Sep. 24, 2012 From the International Searching Authority Re. Application No. PCT/IL2012/050036. (19 Pages).
Interview Summary Dated Apr. 6, 2020 from the US Patent and Trademark Office Re. U.S. Appl. No. 13/983,419. (3 pages).
Office Action Dated Sep. 8, 2016 From the Israel Patent Office Re. Application No. 227589. (3 Pages).
Office Action Dated Jan. 10, 2017 From the Israel Patent Office Re. Application No. 227589 and Its Translation Into English. (6 Pages).
Office Action Dated Oct. 31, 2018 From the Israel Patent Office Re. Application No. 227589 and Its Translation Into English. (11 Pages).
Official Action Dated Feb. 12, 2020 From the US Patent and Trademark Office Re. U.S. Appl. No. 13/983,419. (12 pages).
Official Action Dated Dec. 14, 2015 From the US Patent and Trademark Office Re. U.S. Appl. No. 13/983,419. (21 Pages).
Official Action Dated Jul. 19, 2016 From the US Patent and Trademark Office Re. U.S. Appl. No. 13/983,419. (22 Pages).
Official Action Dated Dec. 22, 2017 From the US Patent and Trademark Office Re. U.S. Appl. No. 13/983,419. (15 pages).
Official Action Dated Sep. 24, 2018 From the US Patent and Trademark Office Re. U.S. Appl. No. 13/983,419. (14 pages).
Official Action Dated Aug. 30, 2019 From the US Patent and Trademark Office Re. U.S. Appl. No. 13/983,419. (16 pages).
Summons to Attend Oral Proceedings Pursuant to Rule 115(1) EPC Dated Nov. 4, 2020 From the European Patent Office Re. Application No. 12741756.6. (7 Pages).
Supplementary European Search Report and the European Search Opinion Dated Jul. 6, 2017 From the European Patent Office Re. Application No. 12741756.6. (7 Pages).
Ben-Simon et al. "Never Resting Brain: Simultaneous Representation of Two Alpha Related Processes in Humans", PLoS ONE, 3(12): e3984-1-e3984-9, Dec. 19, 2008.
Gruzelier "EEG-Neurofeedback for Optimising Performance. III: A Review of Methodological and Theoretical Considerations", Neuroscience and Biobehavioral Reviews, 44: 159-182, Available Online Mar. 29, 2014.

(56) References Cited

OTHER PUBLICATIONS

Mantini et al. "Electrophysiological Signatures of Resting State Networks in the Human Brain", Proceedings of the National Academy of Sciences, 104(32): 13150-13175, Aug. 7, 2007.
Sadeh et al. "The Validity of the Face-Selective Erp N170 Component During Simultaneous Recording With Functional MRI", NeuroImage, 42(2): 778-786, Available Online Apr. 20, 2008.
Zhdanov et al. "Inferring Functional Brain States Using Temporal Evolution of Regularized Classifiers", Computational Intelligence and Neuroscience, 2007(Art.ID 52609): 1-8, 2007.
Final Official Action Dated Feb. 3, 2023 from the US Patent and Trademark Office Re. U.S. Appl. No. 16/473,256. (12 pages).
Final Official Action Dated Apr. 7, 2021 from the US Patent and Trademark Office Re. U.S. Appl. No. 16/473,256. (16 pages).
Final Official Action Dated Apr. 9, 2020 from the US Patent and Trademark Office Re. U.S. Appl. No. 16/473,256. (10 pages).
International Preliminary Report on Patentability Dated Jul. 4, 2019 From the International Bureau of WIPO Re. Application No. PCT/IB2017/058300. (9 Pages).
International Preliminary Report on Patentability Dated Jan. 5, 2023 From the International Bureau of WIPO Re. Application No. PCT/IL2021/050764. (10 Pages).
International Preliminary Report on Patentability Dated Jun. 24, 2021 From the International Bureau of WIPO Re. Application No. PCT/IL2019/051345. (10 Pages).
International Preliminary Report on Patentability Dated May 27, 2021 From the International Bureau of WIPO Re. Application No. PCT/IL2019/051245. (10 Pages).
International Search Report and the Written Opinion Dated Oct. 4, 2021 From the International Searching Authority Re. Application No. PCT/IL2021/050680 .. (16 Pages).
International Search Report and the Written Opinion Dated Apr. 9, 2018 From the International Searching Authority Re. Application No. PCT/IB2017/058300. (15 Pages).
International Search Report and the Written Opinion Dated Feb. 13, 2020 From the International Searching Authority Re. Application No. PCT/IL2019/051245. (15 Pages).
International Search Report and the Written Opinion Dated Mar. 16, 2020 From the International Searching Authority Re. Application No. PCT/IL2019/051345. (15 Pages).
Interview Summary Dated Mar. 8, 2021 From the US Patent and Trademark Office Re. U.S. Appl. No. 16/473,256. (3 Pages).
Interview Summary Dated Oct. 18, 2022 From the US Patent and Trademark Office Re. U.S. Appl. No. 16/473,256. (2 Pages).
Official Action Dated Jul. 12, 2022 from US Patent and Trademark Office Re. U.S. Appl. No. 16/473,256. (13 pages).
Official Action Dated Nov. 26, 2019 From the US Patent and Trademark Office Re. U.S. Appl. No. 16/473,256. (15 pages).
Official Action Dated Sep. 4, 2020 from the US Patent and Trademark Office Re. U.S. Appl. No. 16/473,256. (11 pages).
Supplementary European Search Report and the European Search Opinion Dated Jul. 21, 2022 From the European Patent Office Re. Application No. 19896188.0. (8 Pages).
Supplementary European Search Report and the European Search Opinion Dated Jul. 25, 2022 From the European Patent Office Re. Application No. 19883552.2. (16 Pages).
Admon et al. "A Causal Model of Post-Traumatic Stress Disorder: Disentangling Predisposed From Acquired Neural Abnormalities", Trends in Cognitive Sciences, 17(7): 337-347, Jul. 2013.
Admon et al. "Human Vulnerability to Stress Depends on Amygdala's Predisposition and Hippocampal Plasticity", Proc. Natl. acad. Sci. USA, PNAS, 106(33): 14120-14125, Aug. 18, 2009.
Admon et al. "Imbalanced Neural Responsivity to Risk and Reward Indicates Stress Vulnerability in Humans", Cerebral Cortex, 23(1): 28-35, Advance Access Publication Jan. 30, 2012.
Admon et al. "Imbalanced Neural Responsivity to Risk and Reward Indicates Stress Vulnerability in Humans", Cerebral Cortex, 23: 28-35, Advance Access Publication Jan. 30, 2012.
Alegria et al. "Real-Time fMRI Neurofeedback in Adolescents With Attention Deficit Hyperactivity Disorder", Human Brain Mapping, 38(6): 3190-3209, Published Online Mar. 13, 2017.
Alkoby et al. "Can We Predict Who Will Respond to Neurofeedback? A Review of the Efficacy Problem and Existing Predictors for Successful EEG Neurofeedback Learning", Neuroscience, 378: 155-164, Published Online Jan. 17, 2017.
Allen et al. "Identification of EEG Events in the MR Scanner: The Problem of Pulse Artifact and a Method for Its Subtraction", NeuroImage, 8(3): 229-239, Oct. 1998.
Auriel et al. "Effects of Methylphenidate on Cognitive Function and Gait in Patients With Parkinson's Disease", Clinical Neuropharmacology, 29(1): 15-17, Jan.-Feb. 2006.
Bagby et al. "The Twenty-Item Toronto Alexithymia Scale—I. Item Selection and Cross-Validation of the Factor Structure", Journal of Psychosomatic Research, 38(1): 23-32, Jan. 1994.
Beck et al. "Psychometric Properties of the Beck Depression Inventory: Twenty- Five Years of Evaluation", Clinical Psychology Review, 8(1): 77-100, Jan. 1988.
Ben-Simon et al. "Never Resting Brain: Simultaneous Representation of Two Alpha Related Processes in Humans", PLOS One, 3(12):e3984, 9P., Published Online Dec. 19, 2008.
Bickel "How to Measure Drug Transport Across the Blood-Brain Barrier", NeuroRX, 2(1): 15-26, Jan. 2005.
Birbaumer et al. "Learned Regulation of Brain Metabolism", Trends in Cognitive Sciences, 17(6): 295-302, Jun. 2013.
Bisson et al. "Post-Traumatic Stress Disorder", The British Medical Journal, BMJ, 335(7597): 789-793, Apr. 14, 2007.
Campbell et al. "Prevalence of Depression-PTSD Comorbidity: Implications for Clinical Practice Guidelines and Primary Care-Based Interventions", Journal of General Internal Medicine, JGIM, 22(6): 711-718, Published Online Jan. 24, 2007.
Caro "Blood Flow in Capillaries", The Mechanics of the Circulation, Cambridge University Press, Chap. 13: 392-411, 2012.
Censor et al. "Common Mechanisms of Human Perceptual and Motor Learning", Nature Reviews Neuroscience, 13(9): 658-664, Sep. 2012.
Chen et al. "10 Principles of BOLD Functional MRI", Red, Chap. 10: 103-113, 1996.
Chen et al. "Global Cerebral Oxidative Metabolism During Hypercapnis and Hyocapnia in Humans: Implications for BOLD fMRI", Journal of Cerebral Blood Flow & Metabolism, 30(6): 1094-1099, Published Online Apr. 7, 2010.
Ciris et al. "Non-Invasive Quantification of Absolute Cerebral Blood vol. During Functional Activation Applicable to the Whole Human Brain", Magnetic Resonance in Medicine, 71: 580-590, Published Online Mar. 8, 2013.
Cohen et al. "Multi-Modal Virtual Scenario Enhances Neurofeedback Learning", Frontiers in Robotics and AI, 3(52):1-11, Aug. 31, 2016.
Cohen et al. "Multi-Model Virtual Scenario Enhances Neurofeedback Learning", Frontiers in Robotics and AI, 3(Art.52): 1-11, Published Online Aug. 31, 2016.
Congedo et al. "Low-Resolution Electromagnetic Tomography Neurofeedback", IEEE Transactions on Neural Systems and Rehabilitation Engineering, 12(4):387-397,Dec. 13, 2004.
Crone "The Permeability of Capillaries in Various Organs as Determined by Use of the 'Indicator Diffusion' Method", Acta Physiologica Scandinavica, 58(4): 292-305, Aug. 1963.
Daw et al. "Model-Based Influences on Humans' Choices and Striatal Prediction Errors", Cell Press, 69(6):1204-1215, Mar. 24, 2011.
De Munck et al. "The Hemodynamic Response of the Alpha Rhythm: An EEG/fMRI Study", NeuroImage, 35(3):1142-1151, Apr. 15, 2007.
De Vente et al. "Alexithymia, Risk Factor or Consequence of Work-Related Stress?", Psychotherapy and Psychosomatics, 75(5):304-311, 2006.
Dolan et al. "Amygdala Automaticity in Emotional Processing", Annals of the New York Academy of Sciences, 985(1): 348-355, Apr. 2003.
Drobyshevsky et al. "A Rapid fMRI Task Battery for Mapping of Visual, Motor, Cognitive and Emotional Function", Neuroimage, 31(2): 732-744, Published Online Feb. 20, 2006.

(56) References Cited

OTHER PUBLICATIONS

Dudai "Reconsolidation: The Advantage of Being Refocused", Current Opinion in Neurobiology, 16(2): 174-178, Available Online Mar. 24, 2006.

Durham "posttraumatic Stress Disorder and Resilience in Iraq and Afghanistan Veterans: The Mediator Roles of Maculine Gender Role Stress and Alexithymia", A Dissertation submitted to the Graduate School in Partial Fulfillment of the Requirements for the Degree Doctor of Philosophy, Counseling Psychology, New Mexico State University, Las Cruces, New Mexico, USA, Chap.1: 1-8, Aug. 2016.

Egner et al. "EEG Signature and Phenomenology of Alpha/Theta Neurofeedback Training Versus Mock Feedback", Applied Psychophysiology and Biofeedback, 27(4): 261-270, Dec. 2002.

Etkin et al. "Emotional Processing in Anterior Cingulate and Medial Prefrontal Cortex", Trends in Cognitive Sciences, 15(2): 85-93, Feb. 2011.

Etkin et al. "Failure of Anterior Cingulate Activation and Connectivity With the Amygdala During Implicit Regulation of Emotional Processing in Generalized Anxiety Disorder", American Journal of Psychiatry, 167(5): 545-554, May 2010.

Etkin et al. "Resolving Emotional Conflict: A Role for the Rostral Anterior Cingulate Cortex in Modulating Activity in the Amygdala", Neuron, 51(6): 871-882, Sep. 21, 2006.

Etkin et al. "The Neural Bases of Emotion Regulation", Nature Reviews Neuroscience, 16(11): 693-700, Nov. 2015.

Feldmann Barrett et al. "Interoceptive Predictions in the Brain", Nature Reviews Neuroscience, 16(7): 419-429, Published Online May 28, 2015.

Fenster et al. "Brain Circuit Dysfunction in Post-Traumatic Stress Disorder: From Mouse to Man", Nature Reviews Neuroscience, 19(9): 535-551, Sep. 2018.

Ferrucci et al. "Effects of Reward Size and Context on Learning in Macaque Monkeys", Behavioural Brain Research, 372: 111983-1-111983-5, Available Online May 26, 2019.

Frank "By Carrot or by Stick: Cognitive Reinforcement Learning in Parkinsonism", Science, 306:1941-1943, Dec. 10, 2004.

Franz et al. "Alexithymia in the German General Population", Social Psychiatry and Psychiatric Epidemiology, 43(1): 54-62, Published Online Oct. 12, 2007.

Frewen et al. "Alexithymia in PTSD: Psychometric and FMRI Studies", Annals of the New York Academy of Sciences, 1071(1): 397-400, Jul. 2006.

Frewen et al. "Meta-Analysis of Alexithymia in Posttraumatic Stress Disorder", Journal of Traumatic Stress, 21(2): 243-246, Apr. 2008.

Gamo et al. "Methylphenidate and Atomoxetine Enhance Prefrontal Function Through Alpha2-Adrenenergic and Dopamine D1 Receptors", Journal of the American Academy of Child & Adolescent Psychiatry, 49(10): 1011-1023, Oct. 2010.

Garnefski et al. "The Cognitive Emotion Regulation Questionnaire: Psychometric Features and Prospective Relationships With Depression and Anxiety in Adults", Europan Journal of Psychological Assessment, 23(3): 141-149, Jan. 2007.

Gerin et al. "Real-Time fMRI Neurofeedback With War Veterans With Chronic Ptsd: A Feasibility Study", Frontiers in Psychiatry, 7(Art.111): 1-11 , Published Online Jun. 21, 2016.

Gess et al. "Task-Dependent Recruitment of Intrinsic Brain Networks Reflects Normative Variance in Cognition", Brain and Behavior, 4(5): 650-664, Published Online Jul. 9, 2014 & Supplementary Materials.

Gilam et al. "Neural Substrates Underlying the Tendency to Accept Anger-Infused Ultimatum Offers During Dynamic Social Interactions", NeuroImage, 120: 400-411, Available Online Jul. 9, 2015.

Gold et al. "Cadet Basic Training: An Ethnographic Study of Stress and Coping", Military Medicine, 165(2): 147-152, Feb. 2000.

Goldman et al. "Simultaneous EEG and fMRI of the Alpha Rhythm", Neuroreport, 13(18):2487-2492, Dec. 20, 2002.

Goldway et al. "Volitional Limbic Neuromodulation Has A Multifaceted Clinical Benefit in Fibromyalgia Patients", NeuroImage, 186: 758-770, Nov. 5, 2018.

Goldway et al. "VolitionalLlimbic Neuromodulation Exerts a Beneficial Clinical Effect on Fibromyalgia", NeuroImage, 186:758-770, Feb. 1, 2019.

Grech et al. "Review on Solving the Inverse Problem in EEG Source Analysis", Journal of NeuroEngineering and Rehabilitation, 5(25):1-33, Nov. 7, 2008.

Gross "Emotion Regulation: Current Status and Future Prospects", Psychological Inquiry, 26(1): 1-26, Published Online Mar. 9, 2015.

Gruzelier "EEG-Neurofeedback for Optimising Performance. II: Creativity, the Performing Arts and Ecological Validity", Neuroscience and Biobehavioral Reviews, 44: 142-158, Available Online Nov. 15, 2013.

Gruzelier "EEG-Neurofeedback for Optimising Performance. III: A Review of Methodological and Theoretical Considerations", Neuroscience and Biobehavioral Reviews, 44: 159-182, Published Online Mar. 29, 2014.

Haber et al. "The Reward Circuit: Linking Primate Anatomy and Human Imaging", Neuropsychopharmacology Reviews, 35(1): 4-26, Published Online Oct. 7, 2009.

Hayes et al. "Quantitative Meta-Analysis of Neural Activity in Posttraumatic Stress Disorder", Biology of Mood & Anxiety Disorders, 2(9): 1-13, May 18, 2012.

Herwig et al. "Training Emotion Regulation Through Real-Time fMRI Neurofeedback of Amygdala Activity", NeuroImage, 184: 687-696, Published Online Oct. 6, 2018.

Huang et al. "Methylphenidate on Cognitive Improvement in Patients With Traumatic Brain Injury: A Meta-Analysis", Current Neuropharmacology, 14(3): 272-281, Apr. 2016.

Imel et al. "Meta-Analysis of Dropout in Treatments for Posttraumatic Stress Disorder", Journal of Consulting and Clinial Psychology, 81(3): 394-404, Published Online Jan. 21, 2013.

Johnston et al. "Neurofeedback: A Promising Tool for the Self-Regulation of Emotion Networks", NeuroImage, 49(1): 1066-1072, Available Online Jul. 29, 2009.

Johnstone et al. "Failure to Regulate: Counterproductive Recruitment of Top-Down Prefrontal-Subcortical Circuitry in Major Depression", The Journal of Neuroscience, 27(33): 8877-8884, Apr. 15, 2007.

Jonas et al. "Psychological and Pharmacological Treatments for Adults With Posttraumatic Stress Disorder (PTSD)", Effective Health Care Program, Comparative Effectiveness Review, AHRQ Publication No. 13-EHC011-EF, 92: 1-760, Apr. 2013. (Part 1).

Jonas et al. "Psychological and Pharmacological Treatments for Adults With Posttraumatic Stress Disorder (PTSD)", Effective Health Care Program, Comparative Effectiveness Review, AHRQ Publication No. 13-EHC011-EF, 92: 1-760, Apr. 2013. (Part 2).

Jonas et al. "Psychological and Pharmacological Treatments for Adults With Posttraumatic Stress Disorder (PTSD)", Effective Health Care Program, Comparative Effectiveness Review, AHRQ Publication No. 13-EHC011-EF, 92: 1-760, Apr. 2013. (Part 3).

Jonassen et al. "Individual Differences and Instruction", Handbook of Individual Differences, Learning, and Instruction, Part I(Chap.2): 19-34, 1993.

Jones "PEAR's eFormulation Platform", YouTube Video: Beth Rogozinski from Pear Therapeutics at HealthTech Women, 1 P., Published Online on Jul. 14, 2016.

Kadosh et al. "A Systematic Review of the Psychological Factors That Influence Neurofeedback Learning Outcomes", NeuroImage, 185: 545-555, Published Online Oct. 10, 2018.

Kahn et al. "The Role of the Amygdala in Signaling Prospective Outcome of Choice", Neuron, 33(6):983-994, Mar. 14, 2002.

Kalisch et al. "The Resilience Framework as A Strategy to Combat Stress-Related Disorders", Nature Human Behaviour, 1(11): 784-790, Published Online Oct. 16, 2017.

Kandel et al. "The Molecular and Systems Biology of Memory", Cell, 157(1): 163-186, Mar. 27, 2014.

Karam et al. "Cumulative Traumas and Risk Thresholds: 12-Month PTSD in the World Mental Health (WMH) Surveys", Depression and Anxiety, 31(2): 130-142, Published Online Aug. 27, 2013.

(56) References Cited

OTHER PUBLICATIONS

Kessler et al. "Posttraumatic Stress Disorder in the National Comorbidity Survey", Archives of General Psychiatry, 52(12): 1048-1060, Dec. 1995.
Keynan et al. "Electrical Fingerprint of the Amygdala Guides Neurofeedback Training for Stress Resilience", Nature Human Behaviour, 3(1): 63-73, Published Online Dec. 10, 2018.
Keynan et al. "Electrical Fingerprint of the Amygdala Guides Neurofeedback Training for Stress Resilience", Nature Human Behaviour, 3(1):63-73, Dec. 10, 2018.
Keynan et al. "Limbic Activity Modulation Guided by fMRI-Inspired EEG Improves Implicit Emotion Regulation", Biological Psychiatry, 80(6): 490-496, 2016.
Keynan et al. "Limbic Activity Modulation Guided by Functional Magnetic Resonance Imaging—Inspired Electroencephalography Improves Implicit Emotion Regulation", Biological Psychiatry, 80(6):490-496,Sep. 15, 2016.
Kinreich et al. "Categorized EEG Neurofeedback Performance Unveils Simultaneous fMRI Deep Brain Activation", Proceedings of the 1st International Conference on Machine Learning and Interpretation in Neuroimaging, MLINI 2011, Sierra Nevada, Spain, Dec. 16-17, 2011, LNAI 7263: 108-115, Dec. 16, 2011.
Kober et al. "Placebo Hampers Ability to Self-Regulate Brain Activity: A Double-Blind Sham-Controlled Neurofeedback Study", NeuroImage, 181: 797-806, Published Online Jul. 18, 2018.
Krieger et al. "Cerebral Blood Volume Changes During Brain Activation", Journal of Cerebral Blood Flow & Metabolism, 32: 1618-1631, Published Online May 9, 2012.
Lange et al. "The History of Attention Deficit Hyperactivity Disorder", ADHD Attention Deficit and Hyperactivity Disorders, 2(4): 241-255, Published Online Nov. 30, 2010.
Lanius et al. "Emotion Modulation of PTSD: Clinical and Neurobiological Evidence for A Dissociative Subtype", American Jouranl of Psychiatry, 167(6): 640-647, Jun. 2010.
Larson et al. "Physical Symptoms as Indicators of Depression and Anxiety", Military Medicine, 166(9): 796-799, Sep. 2001.
Laufs et al. "Recent Advances in Recording Electrophysiological Data Simultaneously with Magnetic Resonance Imaging", NeuroImage,40(2):515-528, Apr. 1, 2008.
LeDoux "The Emotional Brain, Fear, and the Amygdala", Cellular and Molecular Neurobiology, 23(4/5): 727-738, Oct. 2003.
Linden et al. "Real-Time Self-Regulation of Emotion Networks in Patients With Depression", PLoS ONE, 7(6): e38115-1-e38115-10, Published Online Jun. 4, 2012.
Lindholm et al. "Alexithymic Features in Relaton to the Dexamethasone Suppression Test in a Finnish Population Sample", American Journal of Psychiatry, 147(9): 1216-1219, Sep. 1990.
Lubianiker et al. "Process-Based Framework for Precise Neuromodulation", Nature Human Behaviour, 3(7): 760-1-760-10, Published Online Apr. 15, 2019.
Lubianiker et al. Process-Based Framework for Precise Neuromodulation:, Nature Human Behaviour, 3(5):436-445. Apr. 15, 2019.
Luijten et al. "Systematic Review of ERP and fMRI Studies Investigating Inhibitory Control and Error Processing in People with Substance Dependence and Behavioural Addictions", Journal of Psychiatry Neuroscience, 39(3):149-169, May 2014.
Ma et al. "Amantadine and Memantine: A Comprehensive Review for Acquired Brain Injury", Brain Injury, 34(3): 299-315, Published Online Feb. 20, 2020.
Maier "Behavioral Control Blunts Reactions to Contemporaneous and Future Adverse Events: Medial Prefrontal Cortex Plasticity and A Corticostriatal Network", Neurobiology of Stress, 1: 12-22, Available Online Sep. 20, 2014.
Mantini et al. "Electrophysiological Signatures of Resting State Networks in the Human Brain", Proceedings of the National Academy of Sciences, 104(32):13170-13175, Aug. 7, 2007.
Marquand et al. "Dissociable Effects of Methylphenidate, Atomoxetine and Placebo on Regional Cerebral Blood Flow in Healthy Volunteers at Rest: A Multi-Class Pattern Recognition Approach", NeuroImage, 60: 1015-1024, Available Online Jan. 14, 2012.

Marxen et al. "Amygdala Regulation Following fMRI-Neurofeedback Without Instructed Strategies", Frontiers in Human Neuroscience, 10: Art.183): 1-14, Published Online Apr. 26, 2016.
Meir-Hasson et al. "An EEG Finger-Print of fMRI Deep Regional Activation", NeuroImage, 102(Pt.1): 128-141, Available Online Nov. 15, 2013.
Meir-Hasson et al. "One-Class fMRI-Inspired EEG Model for Self-Regulating Training", PLOS ONE, 11(5): e0154968-1-e0154968-17, Published Online May 10, 2016.
Meir-Hasson et al. "One-Class FMRI-Inspired EEG Model for Self-Regulation Training", PLOS One, 11(5): e0154968:17P.,May 10, 2016.
Morris et al. "A Subcortical Pathway to the Right Amygdala Mediating 'Unseen' Fear", Proc. Natl. Acad. Sci. USA, 96(4): 1680-1685, Feb. 16, 1999.
Morrison et al. "Sources of Variation Influencing Concordance Between Functional MRI and Direct Cortical Stimulation in Brain Tumor Surgery", Frontiers in Neuroscience, 10: 461-1-461-16, Published Online Oct. 18, 2016.
Nader et al. "Fear Memories Require Protein Synthesis in the Amygdala for Reconsolidation After Retrieval", Nature, 406(6797): 722-726, Aug. 17, 2000.
Nicholson et al. "Intrinsic Connectivity Network Dynamics in PTSD During Amygdala Downregulation", Human Brain Mapping, 39(11): 4258-4275, Published Online Jul. 13, 2018.
Nicholson et al. "The Neurobiology of Emotion Regulation in Posttraumatic Stress Disorder: Amygdala Downregulation Via Real-Time fMRI Neurofeedback", Human Brain Mapping, 38(1): 541-560, Published Online Sep. 20, 2016.
Nowrangi et al. "Systematic Review of Neuroimaging Correlates of Executive Functioning: Converging Evidence From Different Clinical Populations", Journal of Neuropsychiatry and Clinical Neurosciences 26(2): 114-125, Apr. 1, 2014.
Öhman et al. "Fears, Phobias, and Preparedness: Toward An Evolved Module of Fear and Fear Learning", Psychological Review, 108(3): 483-522, Jul. 2001.
Owen et al. "N-Back Working Memory Paradigm: A Meta-Analysis of Normative Functional Neuroimaging Studies", Human Brain Mapping, 25(1): 46-59, Published Online Apr. 21, 2005.
Paret et al. "Alterations of Amygdala-Prefrontal Connectivity With Real-Time fMRI Neurofeedback in BPD Patients", Social Cognitive and Affective Neuroscience, 11(6): 952-960, Advance Access Publication Feb. 1, 2016.
Paret et al. "Current Progress in Real-Time Functional Magnetic Resonance-Based Neurofeedback: Methodological Challenges and Achievements", NeuroImage, 202: 116107-1-116107-13, Available Online Aug. 19, 2019.
Paret et al. "Down-Regulation of Amygdala Activation With Real-Time fMRI Neurofeedback in a Healthy Female Sample", Frontiers in Behavioral Neuroscience, 8(Art.299): 1-15, Published Online Sep. 18, 2014.
Paret et al. "FMRI Neurofeedback of Amygdala Response to Aversive Stimuli Enhances Prefrontal-Limbic Brain Connectivity", NeuroImage, 125: 182-188, Published Online Oct. 16, 2015.
Paret et al. "Monitoring and Control of Amygdala Neurofeedback Involves Distributed Information Processing in the Human Brain", Human Brain Mapping, 39(7):3018-3031, Mar. 30, 2018.
Pear Therapeutics "THRIVE for Schizophrenia", Product Description, Peartherapeutics.com, 1 P., 2018.
Pessoa et al. "Emotion Processing and the Amygdala: From A 'Low Road' to 'Many Roads' of Evaluating Biological Significance", Nature Reviews Neuroscience, 11(11): 773-783, Nov. 2010.
Pizzagalli et al. "Reduced Hedonic Capacity in Major Depressive Disorder: Evidence from a Probabilistic Reward Task", Journal of Psychiatric Research, 43(1):76-87, Nov. 2008.
Powers et al. "A Meta-Analytic Review of Prolonged Exposure for Posttraumatic Stress Disorder", Clinical Psychology Review, 30(6): 635-641, Published Online May 2, 2010.
Ramos-Murguialday et al. "Brain-Machine-Interface in Chronic Stroke Rehabilitation: A Controlled Study", Annals of Neurology, 74(1): 100-108, Published Online Aug. 7, 2013.

(56) References Cited

OTHER PUBLICATIONS

Rance et al. "Time Course of Clinical Change Following Neurofeedback", NeuroImage, 181: 807-813, Available Online May 2, 2018.
Rauch et al. "Prolonged Exposure for PTSD in a Veterans Health Administration PTSD Clinic", Journal of Traumatic Stress, 22(1): 60-64, Feb. 2009.
Renard et al. "OpenViBE: An Open-Source Software Platform to Design, Test and Use Brain-Computer Interfaces in Real and Virtual Environments", Presence, 19(1):35-53, Feb. 1, 2010.
Ritalin "Medication Guide: Ritalin®—(Methylphenidate Hydrochloride, USP) Tablets CII", Prescription Information, Reference ID: 3734564, 3 P., Dec. 2013.
Robinson et al. "Ventral Striatum Response During Reward and Punishment Reversal Learning in Unmedicated Major Depressive Disorder", The American Journal of Psychiatry, 169(2):152-159, Feb. 2012.
Ros et al. "Optimizing Microsurgical Skills With EEg Neurofeedback", BMC Neuroscience, 10(87): 1-10, Published Online Jul. 24, 2009.
Salminen et al. "Prevalence of Alexithymia and Its Association With Sociodemographic Variables in the General Population of Finland", Journal of Psychosomatic Research, 46(1): 75-82, Jan. 1999.
Schiller et al. "Preventing the Return of Fear in Humans Using Reconsolidation Update Mechanisms", Nature, 463(7277): 49-54, Jan. 7, 2010.
Shalev et al. "Conjunctive Continuous Perforamnce Task (CCPT)—A Pure Measure of Sustained Attention", Neuropsychologia, 49: 2584-2591, Available Online May 17, 2011.
Shalev et al. "Interactive Perceptual and Attentional Limits in Visual Extinction", Neurocase, 11(6): 452-462, Dec. 2005.
Shibata et al. "Perceptual Learning Incepted by Decoded fMRI Neurofeedback Without Stimulus Presentation", Science, 334(6061): 1413-1415, Dec. 9, 2011.
Shin et al. "Amygdala, Medial Prefrontal Cortex, and Hippocampal Function in PTSD", Annals of the New York Academy of Sciences, 1071: 67-79, Jul. 2006.
Sitaram et al. "Closed-Loop Brain Training: The Science of Neurofeedback", Nature Reviews Neuroscience, 18(2): 86-100, Published Online Dec. 22, 2016.
Spielberger "State-Trait Anxiety Inventory", The Corsini Encyclopedia of Psychology, 1 P., Jan. 30, 2010.
Stefanovic et al. "Functional Reactivity of Cerebral Capillaries", Journal of Cerebral Blood Flow & Metabolism, 28(5): 961-972, 2008.
Sterne et al. "Multiple Imputation for Missing Data in Epidemiological and Clinical Research: Potential and Pitfalls", BMJ, 338: b2393-1-b2393-5, Published Online Jun. 29, 2009.
Taylor et al. "The 20-Item Toronto Alexithymia Scale. IV. Reliability and Factorial Validity in Different Languages and Cultures", Journal of Psychosomatic Research, 55(3): 277-283, Sep. 2003.
Thatcher "Loreta Z Score Biofeedback", Neuroconnections:1-7, Dec. 2010.
Thibault et al. "Neurofeedback or Neuroplacebo?", Brain, 140(4): 862-864, Apr. 1, 2017.
Thibault et al. "Neurofeedback, Self-Regulation, and Brain Imaging: Clinical Science and Fad in the Service of Mental Disorders", Psychotherapy and Psychosomatics, 84(4): 193-207, Published Online May 23, 2015.
Thibault et al. "The Self-Regulating Brain and Neurofeedback: Experimental Science and Clinical Promise", Cortex, 74: 247-261, Published Online Nov. 18, 2015.
Treadway et al. "Worth the 'EEfRT'? The Effort Expenditure for Rewards Task as an Objective Measure of Motivation and Anhedonia", PLOS One, 4(8):e6598:1-9, Aug. 12, 2009.
Valdes-Sosa et al. "Model Driven EEG/fMRI Fusion of Brain Oscillations", Human Brain Mapping, 30(9):2701-2721, Sep. 15, 2009.
Van Ginkel et al. "Analysis of Variance of Multiply Imputed Data", Multivariate Behavioral Research, 49(1): 78-91, Published Online Feb. 18, 2014.

Wang et al. "Synaptic Modifications in the Medial Prefrontal Cortex in Susceptibility and Resilience to Stress", The Journal of Neuroscience, 35(22): 7485-7492, May 28, 2014.
Watts et al. "Meta-Analysis of the Efficacy of Treatments for Posttraumatic Stress Disorder", Journal of Clinical of Psychiatry, 74(6): e541-e550, Jun. 2013.
Weathers et al. "The PTSD Checklist (PCL): Reliability, Validity, and Diagnostic Utility", Proceedings of the 9th Annual Convention of the International Society for Traumatic Stress Studies, San Antonio, TX, USA, Oct. 24, 1993, 462: 1-3, Oct. 24, 1993.
Yao et al. "Evaluation of Different Cortical Source Localization Methods Using Simulated and Experimental EEG Data", NeuroImage, 25(2):369-382, Apr. 1, 2005.
Young et al. "Randomized Clinical Trial of Real-Time fMRI Amygdala Neurofeedback for Major Depressive Disorder: Effects on Symptoms and Autobiographical Memory Recall", American Journal of Psychiatry, 174(8): 748-755, Published Online Apr. 14, 2017.
Zotev et al. "Prefrontal Control of the Amygdala During Real-Time fMRI Neurofeedback Training of Emotion Regulation", PLOS ONE, 8(11): e79184-1-e79184-14, Published Online Nov. 6, 2013.
Zotev et al. "Real-Time fMRI Neurofeedback Training of the Amygdala Activity With Simultaneous EEG in Veterans With Combat-Related PTSD", NeuroImage: Clinical, 19: 106-121, Available Online Apr. 8, 2018.
Zotev et al. "Self-Regulation of Amygdala Activation Using Real-Time fMRI Neurofeedback", PLoS ONE, 6(9): e24522-1-e24522-17, Published Online Sep. 8, 2011.
Zumer et al. "Relating BOLD fMRI and Neural Oscillations through Convolution and Optimal Linear Weighting", NeuroImage, 49(2):1479-1489, Jan. 15, 2010.
Decision to Refuse Dated Dec. 5, 2022 From the European Patent Office Re. Application No. 12741756.6 (14 pages).
Minutes of Oral Proceedings Pursuant to Rule 124(4) EPC Dated Nov. 30, 2022 From the European Patent Office Re. Application No. 12741756.6 (20 pages).
Kuhn et al. "Transcranial Focused Ultrasound Selectively Increases Perfusion and Modulates Functional Connectivity of Deep Brain Regions in Humans", Frontiers in Neural Circuits, 17: 1120410-1 1120410-9, Apr. 5, 2023.
Lemaire et al. "MRI Atlas of Human Deep Brain", Frontiers in Neurology, 10:851-1851-8, Aug. 27, 2019.
Pizzo et al. "Deep Brain Activities Can be Detected with Magnetoencephalography", Nature Communications, 10(1):971, 14 Pages, Feb. 27, 2019.
Supplementary European Search Report and the European Search Opinion Dated Apr. 21, 2023 From the European Patent Office Re. Application No. 23154809.0. (10 Pages).
Restriction Official Action Dated Apr. 2, 2024 from the US Patent and Trademark Office Re. U.S. Appl. No. 17/319,265. (6 pages).
International Search Report and the Written Opinion Dated Sep. 26, 2023 From the International Searching Authority Re. Application No. PCT/IL2023/050865. (10 Pages).
Notice of Reason(s) for Rejection Dated Oct. 31, 2023 From the Japan Patent Office Re. Application No. 2021-532247 and Its Translation Into English. (8 Pages).
Fruchtman-Steinbock et al. "Amygdala Electrical-Finger-Print (AmygEFP) NeuroFeedback Guided by Individually-Tailored Trauma Script for Post-Traumatic Stress Disorder: Proof-of-Concept", NeuroImage: Clinical, 32: 102859-1-102859-10, Available Online Oct. 15, 2021.
International Search Report and the Written Opinion Dated Feb. 14, 2024 From the International Searching Authority Re. Application No. PCT/IL2023/051275 (8 Pages).
Supplementary European Search Report and the European Search Opinion Dated Apr. 21, 2023 From the European Patent Office Re. Application No. 21828084.0. (14 Pages).
Ehrlich et al. "A Closed-loop, Music-based Brain-Computer Interface for Emotion Mediation", PLoS ONE 14(3): e0213516, 1-24, Mar. 18, 2019.
Ramirez et al. "Musical Neurofeedback for Treating Depression in Elderly People", Frontiers in Neuroscience, 9(354): 1-10, Oct. 2, 2015.

(56) References Cited

OTHER PUBLICATIONS

Office Action Dated Apr. 7, 2024 From the Israel Patent Office Re. Application No. 267622. (6 Pages).
Official Action Dated Jun. 18, 2024 from the US Patent and Trademark Office Re. U.S. Appl. No. 17/319,265. (85 pages).
Restriction Official Action Dated May 9, 2024 from the US Patent and Trademark Office Re. U.S. Appl. No. 17/342,753. (5 pages).
Notice of Reason(s) for Rejection Dated Jul. 23, 2024 From the Japan Patent Office Re. Application No. 2021-532247 and Its Translation Into English. (6 Pages).
Official Action Dated Jul. 25, 2024 from the US Patent and Trademark Office Re. U.S. Appl. No. 17/342,753. (63 pages).
Communication Pursuant to Article 94(3) EPC Dated Feb. 24, 2025 From the European Patent Office Re. Application No. 19896188.0 (7 Pages).
Final Official Action Dated Feb. 25, 2025 from the US Patent and Trademark Office Re. U.S. Appl. No. 17/319,265. (22 pages).
Final Official Action Dated Feb. 26, 2025 from the US Patent and Trademark Office Re. U.S. Appl. No. 17/342,753. (21 pages).
International Preliminary Report on Patentability Dated Feb. 27, 2025 From the International Bureau of WIPO Re. Application No. PCT/IL 2023/050865 (7 Pages).
Communication Pursuant to Article 94(3) EPC Dated Nov. 20, 2024 From the European Patent Office Re. Application No. 23154809.0. (7 Pages).

* cited by examiner

METHOD AND SYSTEM FOR USE IN MONITORING NEURAL ACTIVITY IN A SUBJECT'S BRAIN

RELATED APPLICATIONS

This application is a continuation of U.S. patent application Ser. No. 13/983,419 filed on Jan. 16, 2014, which is a National Phase of PCT Patent Application No. PCT/IL2012/050036 having International filing date of Feb. 2, 2012, which claims the benefit of priority of U.S. Provisional Patent Application No. 61/438,996 filed on Feb. 3, 2011.

The contents of the above applications are all incorporated by reference as if fully set forth herein in their entirety.

FIELD OF THE INVENTION

This invention relates to medical techniques for detecting neural activity in a living brain, and more specifically for analyzing neural activity.

BACKGROUND OF THE INVENTION

In neuroscience, different practices have been developed for detecting neural activity in a living brain. One such practice is electroencephalography (EEG), which measures electrical signals generated by the brain's neurons, via a multitude of electrodes placed on a subject's scalp. The neural signals are transmitted by wires to an EEG monitoring system that records the neural signals, and generates data about the signal variation in time which can be further analyzed and possibly also displayed. EEG enables high temporal resolution, in the order of milliseconds, and is therefore useful for detecting quick changes in the electrical activity of the brain. EEG, however, has undesirably low spatial resolution, i.e. it lacks accuracy for determining with satisfactory resolution the region from which the neural signals are generated.

Another practice relates to spatial scanning (such as fMRI), i.e. scanning a living brain in order to obtain an image of the brain, in which neurally active regions are differentiated from neurally inactive regions. Spatial scanning is known to provide high-resolution spatial data and is used to pinpoint (within a few millimeters) the neurally active areas.

The high spatial resolution (in the order of millimeters) of the fMRI allows delineating functional brain areas. However, fMRI's temporal resolution is too poor to track neural dynamics. The EEG methodology, which has very poor spatial resolution (in the order of centimeters at best), has nonetheless optimal temporal resolution (in the order of milliseconds) that allows the characterization of specific dynamics of neural activity at millisecond time scales. Simultaneous EEG/fMRI recording has been successfully implemented, to combine high spatial resolution of fMRI and high temporal resolution of EEG. The inventors have demonstrated a good signal-to-noise ratio of EEG data co-recorded with fMRI by high correlations (r>0.9) between EEG data recorded within and without fMRI, as described for example in Ben-Simon E, Podlipsky I, Arieli A, Zhdanov A, Hendler T, Never resting brain: simultaneous representation of two alpha related processes in humans. PLoS ONE, 2008; 3(12) or in Sadeh B, Zhdanov A, Podlipsky I, Hendler T, Yovel G, The validity of the face-selective ERP N170 component during simultaneous recording with functional MRI, NeuroImage, 2008; 42(2):778-786.

The combined EEG/fMRI-Neuro Feedback (NF) therefore may increase the efficiency of EEG-NF or fMRI-NF with high spatial and temporal resolution that could not be revealed otherwise. In this connection, it should be noted that Neurofeedback is generally a type of biofeedback that uses realtime displays of EEG to illustrate brain activity, often with a goal of controlling central nervous system activity.

The relation between EEG data and spatial scan data (generated for e.g. by fMRI) typically relies on statistics provided via simultaneous EEG and spatial scans (e.g. EEG/fMRI) over multiple subjects and multiple trials on long periods of time, usually using different averaging methods such as correlations, trial averaging etc. For example, the inventors have developed machine learning classification methodology on the interpretation of MEG and EEG activity as described in Zhdanov A, Hendler T, Ungerleider L, Intrator N, Inferring functional brain states using temporal evolution of regularized classifiers, Computational Intelligence and Neuroscience, 2007; 2007:52609. The use of summary statistics extracted from multiple subjects and trials allows for improving the signal-to-noise ratio.

GENERAL DESCRIPTION OF THE INVENTION

There is therefore a need to provide a method and a system for monitoring (e.g. inspection, diagnosing) the subject's brain to create a certain brain activity signature that can be used for various applications, for example for neural feedback.

The technique of the invention is capable of analyzing a relation between temporal and spatial measurements of a subject's brain (e.g. EEG data as temporal data and fMRI as spatial scan data; or solely EEG or the like data obtained from a matrix of electrodes), during the brain activity of the subject. As will be described further below, this is particularly useful to create a neural feedback from the patient's brain, which may then be guided only by using EEG brain activity measurements.

It should be understood that for the purposes of the present invention, the subject can be either in an active state, e.g. performing a certain action, e.g. in response to a certain stimulus, or may be in a passive state, e.g. sleeping. Both such active and passive states will be referred to hereinafter as the "brain state". According to the invention, the measured data is analyzed to create a brain activity signature. The signature may be formed by selected functionally-relevant EEG signals and not by rather arbitrary EEG wave oscillations, such as alpha or theta bands. The choice of relevant EEG signals may be made according to a user's specific correlation between temporal and spatial signals (e.g. EEG signals and spatial scan data). The brain activity signature may be user specific, or may be specific for certain population.

In the description below, the temporal data indicative of a neural signal is referred to as EEG data. However it should be understood that the principles of the invention are not limited to this specific type of data, as well as not limited to electrical-type data, and the term EEG data should therefore be interpreted broadly referring to any suitable known type of temporal data indicative of neural signals. Also, it should be understood that such temporal data is actually indicative of time and frequency parameters, and therefore the term temporal data used hereinbefore should be interpreted as time frequency data. Such time-frequency data is indicative of the frequency of a signal measured at certain measurement location (on certain electrode) and the time pattern of measurements, e.g. at different measurement locations (on different electrodes) or signal measured at different times on a single electrode.

Further, in the description below, the spatial data is exemplified as measured data of a type different from the temporal data (e.g. fMRI). However, it should be understood that generally, the EEG data collected from a matrix of electrodes may by itself present a certain type of spatial data. Moreover, the time pattern of the collection of electrical signals from the electrodes (i.e. a so-called "dynamic data") may also be used for the analysis.

Generally speaking, the present invention utilizes multiple measurements on the subject's brain to determine a multi-parameter function of the measured signal variation, i.e. a time-frequency function or preferably a spatial-time-frequency function. Generally, such function may be determined from the electrical measurements themselves (using multiple electrodes at different locations with respect to the subject's brain, i.e. different locations of the subject's scalp), or by one or more electrodes for electrical measurements and additional special scan providing image data from different locations in the brain, such as fMRI. Generally, the measurements that are to be performed for the purposes of creating the subject-related brain activity signature may correspond to any known or unknown brain state. In some embodiments, the brain state is taken into consideration, namely the signature is determined per the brain state. The latter may correspond to the brain activity in response to certain one or more stimuli.

The method of analyzing the relation between EEG data and spatial scan data is aimed at determining a relation between the EEG and spatial scan data acquired continuously (during a certain time period) and simultaneously. In this manner, a region of neural activity (provided by the spatial scan data) and an EEG signal originating therefrom can be related to each other, and possibly also to the certain brain condition (such as performance of a certain task; a response to a certain stimulus; or "passive state" (sleeping)). The relation between the EEG data and the spatial data (which may or may not be also related to the brain condition) is expressed in terms of a calculated EEG signature (fingerprint) being a multi-parameter function, i.e. time and frequency measurements from multiple locations within the brain (measured from multiple electrodes). The EEG signature is indicative of neural activity in a subject's brain, which in some applications may correspond to a certain known brain state, e.g. may correspond to a brain response to a certain known stimulus.

According to one broad aspect of the present invention, there is thus provided a method for use in monitoring neural activity of a subject's brain. The method comprises:
  providing measured data comprising data corresponding to measured signals originated from locations in the subject's brain during a certain time period and being indicative of a subject's brain activity;
  processing the measured data and generating data indicative thereof in the form of a multi-parameter function presenting a relation between frequency and time data of the measured signals;
  analyzing said relation and identifying a subject-related signature corresponding to the subject's brain neural activity.

The signature related data can be appropriately recorded to be further used for interpretation of a brain functional state of the subject or for neural feedback. The signature related data includes the subject's signature(s), and may also include data indicative of the subject's brain state(s) corresponding to the signature(s).

In some embodiments, the measured data includes measurement of one or more signals originated in multiple locations in the subject's brain. The multi-parameter function thus corresponds to a relation between time and frequency of the measured signals and multiple locations in the brain from which the measured signals are originated (i.e. is a spatial-time-frequency function). The signature is in the form of a frequency and time function over selected set of locations from the multiple measurement locations.

In some embodiments, such a spatial-time-frequency function can be obtained from the measured data including only measurements of electrical activity along the subject's scalp obtained from a matrix of electrodes at multiple locations (typically, EEG measurements). In some other embodiments, the measured data includes first measured data including measurements of electrical activity obtained from one or more electrodes, i.e. one or more locations on the subject's scalp, and also includes second measured data in the form of spatial scan data from multiple location in the brain obtained for example by fMRI measurements, which associates the electrode location with a corresponding location in the brain from which the signal measured by said electrode is originated. In the latter case, the electrical activity measurements and the spatial scan are carried out simultaneously in order to identify one or more regions of neural activity in the subject's brain and an activity level of the one or more regions corresponding to individual functions of the brain.

According to another broad aspect of the present invention, there is thus provided a method for use in monitoring neural activity of a subject's brain, the method comprising:
  providing first measured data in the form of one or more electrical signals measured during a certain time period and being indicative of subject's brain activity collected from one or more measurement locations at the subject's scalp, and second measured data in the form of image data variation within the subject's brain during said certain time period;
  processing the first and second measured data and generating a corresponding multi-parameter function presenting a relation between frequency and time data of the one or more measured electrical signals and the multiple measurement locations in the brain;
  analyzing said relation and identifying a subject-related signature corresponding to the subject's brain neural activity, the signature being in the form of a frequency and time function over selected set of locations from said multiple measurement locations.

According to yet another broad aspect of the present invention, there is provided a method for use in monitoring neural activity of a subject's brain. The method comprises:
  providing measured data comprising data corresponding to signals collected from multiple measurement locations during a certain time period and being indicative of a certain known subject's brain state;
  processing the measured data and generating data indicative thereof in the form of a multi-parameter function presenting a relation between frequency and time data of the measured signals and the multiple measurement locations for said known subject's brain state;
  analyzing said relation and identifying a subject-related signature corresponding to the subject's brain neural activity at said brain state, the signature being in the form of a frequency and time function over selected set of locations from said multiple measurement locations.

According to yet further broad aspect of the present invention, there is thus provided a method for use in monitoring neural activity of a subject's brain, the method comprising:

providing first measured data in the form of electrical signals measured during a certain time period collected from one or more measurement locations at the subject's scalp and corresponding to a certain known subject's brain state, and providing second measured data in the form of an imaging signal variation within the subject's brain measured during said certain time period;

processing the first and second measured data and generating a corresponding multi-parameter function presenting a relation between frequency and time data of the measured electrical signals and multiple locations in the brain corresponding to the multiple measurement locations;

analyzing said relation and identifying a subject-related signature corresponding to the subject's brain neural activity at said certain brain state, the signature being in the form of a frequency and time function over selected set of locations from said multiple measurement locations, thereby enabling use of the signature for further interpretation of a brain functional state of the subject using the first measured data.

As indicated above, in some embodiments, the first measured data (i.e. time-frequency data) may be acquired by EEG measurements. However, the present invention is not limited to EEG measurements and other temporal measurements such as MEG (Magnetic Encephalography) may be used as well. In this connection, it should also be noted that generally MEG can be used as a spatial scan measurement technique. In this case EEG and MEG may be used for providing temporal data and spatial scan data respectively; or MEG-based time-frequency measurement may be combined with any other spatial scan technique. The EEG measurements and the spatial scan are performed on one or more predetermined regions of the subject's brain. A stimulus (if used) may be applied according to a predetermined procedure operable to activate the one or more predetermined regions of the brain. The spatial scan data can then be used to validate the activation of the one or more regions by the stimulus.

In some embodiments, the method comprises applying different stimuli to the subject in order to stimulate one or more different regions of the subject's brain, performing the EEG measurements and spatial scan for each of the stimuli; and determining and recording, for each of the stimuli, the corresponding one or more EEG signatures.

In some embodiments, the method comprises performing the measurements and analysis on a plurality of subjects and creating a database of EEG signatures, which may or may not include data indicative of the corresponding plurality of the brain state/conditions (e.g., tasks or stimuli).

In some embodiments, the method comprises performing an independent spatial scan inspection of the one or more regions of the subject's brain while under certain brain state, e.g. the application of the certain stimulus, in order to validate a reliability of the EEG signature.

In some embodiments, the method comprises developing a feedback protocol for training a specific subject, e.g. under certain brain activity of the subject, such as application of the certain stimulus, by identifying a modulation of at least one parameter of an EEG signature, while under the application of the certain stimulus, corresponding to a functional state of the subject's brain at which the one or more regions are at a desired activity level, and using the identified signature to select EEG signals indicative of the functional state.

In some embodiments, the method comprises performing an independent non-invasive measurement of at least one physiological property of the subject. The at least one physiological property is of a kind changing in response to neural activity in the one or more regions of the brain.

The spatial scan may be performed by using medical imaging which comprises at least one of the following techniques: a functional magnetic resonance imaging (fMRI) scan; a magnetic resonance imaging (MRI) scan; a magneto encephalographic (MEG) scan; hemoencephalography (HEG); magnetic resonance spectroscopic imaging (MRS); positron emission tomography (PET); photoacoustic imaging; X-ray computed tomography (CT); Single photon emission computed tomography (SPECT); and a scan based on ultrasound tagging of light.

In some embodiments, analyzing the relation between the EEG temporal data and the spatial scan data to identify the EEG signature may comprise optimization of some value of one or more parameters of at least one predetermined model. The optimization of the at least one model may comprise determining a set of EEG measurement locations from which a part of the EEG data is measured corresponding to the one or more regions under certain brain state, e.g. responding to the stimulus by neural activity and determining time points of measurements corresponding to the brain condition, e.g. response to the stimulus.

In some embodiments, the relation between the EEG data and the spatial scan data is analyzed by processing the spatial scan data to classify the corresponding EEG data in accordance with different functional states categories according to the level of neural activation, thereby enabling to distinguish between different functional brain states of the subject using the EEG data.

In some embodiments, the at least one model may comprise a regularized logistic or ridge regression classifier configured to identify frequency bands in the EEG data related to neural activation of the one or more regions. In a specific and non-limiting example, the EEG signature can be developed as a regularized logistic (ridge) regression classifier constructed from instantaneous signal values (i.e. signal amplitude and/or instantaneous signal power) with a model selection and validation to select optimal regularization parameters and to obtain spatial-time-frequency features contributing to the classification. An optimization of value of one or more parameters of at least one predetermined model is provided by analyzing the relation between the EEG data and the spatial scan data. The identification of the EEG signature enables to select and optimize at least one of the following regularization parameters: a position of a least one pair of relevant electrodes on the subject's scalp; and for each pair of electrodes, relevant frequency bands in the EEG data (e.g. for a specific brain state, e.g. response to external stimulus); a frequency of the neural signal (e.g. after the application of the stimulus), a maximal amplitude of the neural signal (e.g. after the application of the stimulus), at least one time point indicative of the best predicted mental state of the brain at which a change in frequency and/or in maximal amplitude is detected (e.g. after the application of the stimulus). The optimization of the model comprises determining a set of EEG measurement locations from which a part of the EEG data is measured corresponding to one or more regions of the brain, e.g. responding to the stimulus by neural activity, and determining selected time points of measurements, e.g. corresponding to the response to the stimulus. The optimization of the at least one model may therefore comprise providing a relation between one or more frequency bands in EEG data taken from one or more electrodes with the spatial scan data to provide inference of the electrodes locations and frequency bands related to neural activation of the one or more regions.

The selection of the above mentioned regularization parameters improves the spatial resolution of EEG as well as the localization of neural activity of interest. By constructing an individualized model analysis comprising model selection and validation, the above mentioned optimal regularization parameters are selected to obtain optimal spatial-time-frequency features. A machine-learning classification methodology based on this model analysis/interpretation is thus provided using EEG data for functional state inference (i.e. up-regulation/down-regulation of limbic regions) enabling an accurate interpretation (brain state) of the EEG activity. The functional state's category is defined according to the level of activation in the spatial scan images. Variations between subjects in the EEG signature are expected and serve as a basis for the modeling of a neural activation index.

In some embodiments, the method comprises predicting the functional state of the subject based on the EEG data. Predicting the functional state of the subject may comprise selecting at least one machine learning/data mining classifier corresponding to the functional state and analyzing the EEG data for validating reliability of the classifier. Predicting the functional state of the subject may also comprise comparing outcome of the classifier for different time points and selecting a time point indicative of the optimal predicted functional state.

The validation of the signature may be performed by analyzing estimated sources of activation using MR-based head models and/or beamformer approach to projection space. Structural or functional information of MRI signals can be used to identify a signature comprising individual volume conductor (head) models that include different conductivities for the skin, skull, and brain compartments (i.e., a so-called boundary-element model). The identification of such type of signature allows then a spatial filtering of the EEG signal for example by using beamformer approach.

According to yet another broad aspect of the present invention, there is also provided a system for use in monitoring brain activity of a subject. The system comprises:
  a control unit comprising:
    a data input utility for receiving measured data comprising data corresponding to signals indicative of a subject's brain activity collected from one or more measurement locations during a certain time period, and
    a processor utility which is configured and operable for processing the measured data and generating data indicative thereof in the form of a multi-parameter function presenting a relation between frequency and time data of the measured signals and for analyzing said relation and identifying a subject-related signature corresponding to the subject's brain neural activity.

According to yet further aspect of the invention, there is provided a system for use in monitoring brain activity of a subject, the system comprising:
  a measurement device configured and operable for measuring signals originating from a subject's brain during a certain time period and generating measured data comprising data corresponding to signals indicative of a subject's brain activity during said certain time period; and
  a control unit connectable to the measurement device for receiving the measured data and comprising a processor utility which is configured and operable for processing the measured data and generating data indicative thereof in the form of a multi-parameter function presenting a relation between frequency and time data of the measured signals and for analyzing said relation and identifying a subject-related signature corresponding to the subject's brain neural activity.

According to yet further aspect of the invention, there is provided a system for use in monitoring brain activity of a subject, the system comprising:
  a measurement device comprising:
    an EEG electrode arrangement configured for placing on a scalp of a subject and detecting electrical signals originated by neural activity of a subject's brain, and for generating EEG data indicative thereof; and
    a spatial scanner configured for scanning the subject's brain and identifying one or more regions of neural activity in the subject's brain and an activity level of the one or more regions corresponding to individual functions of the brain, and generating a spatial scan data; and
  a control unit configured for controlling simultaneous operation of the EEG electrode arrangement and the spatial scanner, the control unit being configured and operable for receiving the EEG data and the spatial scan data, and for determining and analyzing a relation between the EEG data and the spatial scan data to identify an EEG signature indicative of a spatial neural activation of one or more regions in the subject brain, thereby enabling use of the signature for further interpretation of a brain functional state of the subject by using the EEG data.

In some embodiments, the control unit is configured and operable to identify the EEG signature by optimization of value of one or more parameters of at least one predetermined model; the parameters being selected from at least one of: providing a set of EEG measurement locations from which a part of the EEG data is measured corresponding to the one or more regions responding to the stimulus by neural activity; determining time points of measurements corresponding to the response to the stimulus and providing a relation between one or more frequency bands in EEG data with the spatial scan data to obtain inference of the frequency bands related to neural activation of the one or more regions.

In some embodiments, the control unit is configured and operable to identify the signature by determining a classifier corresponding to a functional state and validating the reliability of the logistic regression classifier.

In some embodiments, the system comprises a non-invasive physiological measuring device, for independently measuring at least one physiological property of the subject being of a kind changing in response to neural activity in the one or more regions of the brain. The control unit is further configured for receiving the measured physiological response and ensuring that the signature found reliably indicates neural activity at the corresponding region, via comparison of the measured physiological response to a previously determined physiological response associated with neural activity of the corresponding region. The control unit may also be further configured for receiving the measured physiological response and processing said measured physiological response to improve the identification of the EEG signature.

According to another broad aspect of the present invention, there is also provided a system for creating a database for use in monitoring brain activity of a subject. The system comprises a data input utility for receiving measured data comprising data corresponding to signals indicative of a subject's brain activity collected from multiple measurement locations during a certain time period (e.g. EEG data and spatial scan data simultaneously measured on brain of a specific subject), and a data processor utility configured for processing the measured data and generating data indicative thereof in the form of a multi-parameter function presenting a relation between frequency and time data of the measured signals and the multiple measurement locations (e.g. a relation between the EEG data and the spatial scan data), and for analyzing said relation and identifying a subject-related signature corresponding to the subject's brain neural activity, the signature being in the form of a frequency and time function over selected set of locations from said multiple measurement locations (e.g. one or more EEG signatures indicative of a certain spatial neural activation as corresponding to one or more regions in the subject brain), thereby enabling use of the signature for further interpretation of a brain functional state of subjects by using the measured data (e.g. EEG data).

Once the EEG signature is recorded, it is possible to identify one or more regions of neural activity and/or the level of the neural activity caused by a specific stimulus and therefore to interpret a brain functional state via an EEG measurement and a processing of the EEG data. In this manner, the recording of the signature enables some diagnostic practices which rely on spatial scans, to be performed via EEG alone based on predetermined EEG signature. The EEG signature may be derived from previous simultaneous spatial and EEG scan of the subject or from a database of signatures. By greatly reducing a need for bulky and expensive spatial scanners (such as scanners based on fMRI, Hemoencephalography (HEG), magneto encephalography (MEG), Magnetic resonance spectroscopic imaging (MRS), positron emission tomography (PET), X-ray computed tomography (CT), Single photon emission computed tomography (SPECT), or ultrasound tagging of light), the cost and space required for performing many medical practices is reduced. Furthermore, because an EEG signature of the spatial brain activity is developed, practices aimed at analyzing subject-dependent spatial brain patterns may also be performed with a greatly reduced use of spatial scanners.

For example, EEG-based neurofeedback (EEG-NF) is a practice that may be improved by the determination of the signature. This is because, typically, protocols used in EEG-NF are not specific enough to target a certain brain area and consequently a certain brain function. The signature determined in the present invention allows identification of neurally active regions in the brain and/or identification of stimuli received by the brain, via an analysis of EEG data alone. Therefore, the present invention provides, inter alia, a technique (and a related system) for performing EEG-NF targeted at improving a subject's modulation of one or more determined regions relating to individual functions of the brain. Moreover, by performing EEG-NF using the technique of the present invention, relevant neural network as indicated by the spatial scan may be targeted. The targeting network is expected to vary from subject to subject.

When the technique of the present invention is used with NF applications, an EEG limbic modulation index is developed to correlate between spatial scan-based NF with EEG signal changes. The characteristic EEG index is deduced from the fMRI activation. The index is composed of EEG features characterizing the spatial scan-targeted brain activity during NF.

According to another broad aspect of the present invention, there is also provided a method for use in performing neurofeedback. The method comprises providing a predetermined signature related data (EEG signature related data) comprising a frequency and time function of electrical signal measured from a set of locations in the subject's brain corresponding to a certain brain condition (e.g. in response to stimulus), the predetermined signature being indicative of a spatial neural activation of one or more regions in a subject brain corresponding to individual functions of the brain while under the certain brain condition and thus corresponding to a predicted certain activity state related to a certain brain condition; subjecting the brain to said condition (e.g. by applying the stimulus) to activate the one or more brain regions; performing the electrical measurements on the subject's brain while under the certain brain condition, and generating measured data indicative thereof (e.g. EEG data); processing the measured data using the predetermined signature to identify one or more parameters indicative of neural activation of the one or more regions while under the given brain condition, and selecting from the measured data signals related to the neural activation.

In some embodiments, the method comprises extracting a modulation of limbic activity from the EEG signals, comparing the extracted modulation of limbic activity to a desired modulation of limbic activity corresponding to the predicted certain activity state; and determining a degree of correlation between the modulation of limbic activity and the desired modulation of limbic activity, enabling to determine a psychological evaluation of the subject.

In some embodiments, the method comprises upon identifying that the extracted modulation and the desired modulation have a high degree of correlation, conveying a message indicating success to the subject; and upon identifying that the extracted modulation and the desired modulation have a low degree of correlation, conveying a message indicating failure to the subject, such that the subject is trained to monitor limbic activity modulation of the one or more region.

In some embodiments, the method comprises after conveying a message indicating failure to the subject, repeating the EEG measurement on the subject while under certain brain condition (e.g. the application of the stimulus) and processing the EEG data. Conveying the message may comprise at least one of: conveying a sound to the subject; displaying an image to the subject; and displaying a video to the subject.

In some embodiments, providing the predetermined EEG signature comprises providing an EEG limbic modulation index indicative of the modulation of the limbic activity.

In some embodiments, the method comprises controlling a timing of the EEG measurement period, and a timing of the application of the stimulus to a subject.

In some embodiments, the method comprises simultaneously with performing the EEG scan: measuring a physiological property of the subject; and after extracting the modulation: using a predetermined signature-to-region map to identify the active region in the subject's brain; and validating the determined regions, by comparing the measured physiological property with a predetermined physiological property associated with neural activity in the identified region.

According to another broad aspect of the present invention, there is also provided a system for use in performing neurofeedback. The system comprises a measurement unit (e.g. an EEG measurement unit) configured for detecting electrical signals originated by neural activity of a subject's brain, and generating measured data (e.g. EEG data) indicative thereof; and a control unit comprising: (i) a memory utility for storage of a predetermined signature (e.g. EEG signals) indicative of spatial neural activation of one or more regions in a subject brain corresponding to individual functions of the brain, the signature corresponding to a predicted subject's brain activity while under certain brain condition (e.g. application of a stimulus); and (ii) a data processor configured and operable for receiving the measured data and for processing the measured data utilizing stored data about the predetermined signature to identify one or more parameters corresponding to neural activation of one or more regions under the certain brain condition of a specific subject during the measurements.

In some embodiments, the system comprises an output interface, configured for conveying a subject a feedback message in real time indicating success or failure of the subject to provide a desired response to a given stimulus, according to a signal generated by the control unit such that the subject is trained to regulate the neural activity of the region via the feedback message.

In some embodiments, the control unit is configured and operable for determining modulation indicative of an activity of a region of the subject's brain, selecting from the EEG data spectrum by using the parameters, EEG signals related to the neural activation and extracting a modulation of limbic activity from the EEG data; for comparing the extracted modulation to a desired modulation indicative of a desired activity state of the subject's brain, for determining a psychological evaluation of the subject and generating a feedback signal thereof. The control unit may be configured and operable to identify the predetermined signature by analyzing a relation between the EEG data with the spatial scan data associated with the activation level of localized brain regions. The control unit may be configured for controlling a timing of the EEG measurement period and a timing of the instruction to the subject within the EEG measurement period by using the parameters, the timing being related to the neural activation.

In some embodiments, the output interface comprises at least one of a display and a speaker, and earphones.

In some embodiments, the control unit is configured and operable to select the EEG data generated by the EEG electrode arrangement, EEG data generated by electrodes generating data indicative of neural activation of the one or more regions. The control unit may be configured and operable to process the EEG data and transform the EEG data to an EEG spectral data and to select the EEG spectral data frequency bands indicative of neural activation of one or more regions.

In some embodiments, the system comprises a non-invasive physiological measuring device configured for independently measuring at least one physiological property of the subject being of a kind changing in response to neural activity in the one or more regions of the brain. The control unit is further configured for using the signature to identify the active region or network in the subject's brain, and validating neural activity in the determined regions by comparing the measured physiological property with a predetermined physiological property associated with neural activity in the identified region. The physiological measuring device may comprise at least one of an electrocardiography device and a skin conductance measurement device.

An aspect of some embodiments of the present invention relates to a method and system for identifying a signature in EEG data, the signature being indicative of neural activity including a specific neural active region or network of regions of the brain, and of a brain state/condition causing such neural activity. The determination of the signature enables a construction of a brain map relating at least one specific signature to at least one specific brain condition producing neural activity in at least one specific region/network of the brain. This map may be used for converting data obtained during an EEG-based measurement to spatial and/or functional data, i.e. to accurately pinpoint a region/network from which neural signals detected by means of EEG originate, and a brain condition causing these neural signals. The above-mentioned map may therefore lead to a reduction in the use of typical spatial scans and an increase in the use of EEG scans alone in some applications that require high spatial resolution.

Another aspect of some embodiments of the present invention relates to a technique aimed at greatly reducing the use of spatial scanner such as fMRI scanner in NF practice, and obtaining reliable data indicative of the neural activity of one or more regions/networks in a subject's brain by extracting a signature from EEG data, by reliance on a suitable signature-to-region and/or signature-to-brain state conversion map. This is achieved by extracting from the images of the regional spatial scanning activation, measured in a preliminary EEG/spatial scanner scan, EEG parameters characterizing the spatial scanner-targeted brain activity during NF. As mentioned above, the EEG parameters may include relevant electrodes, time points indicative of the best predicted mental state of the brain and relevant frequency bands in the EEG spectral data for a specific brain state/condition.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1A:
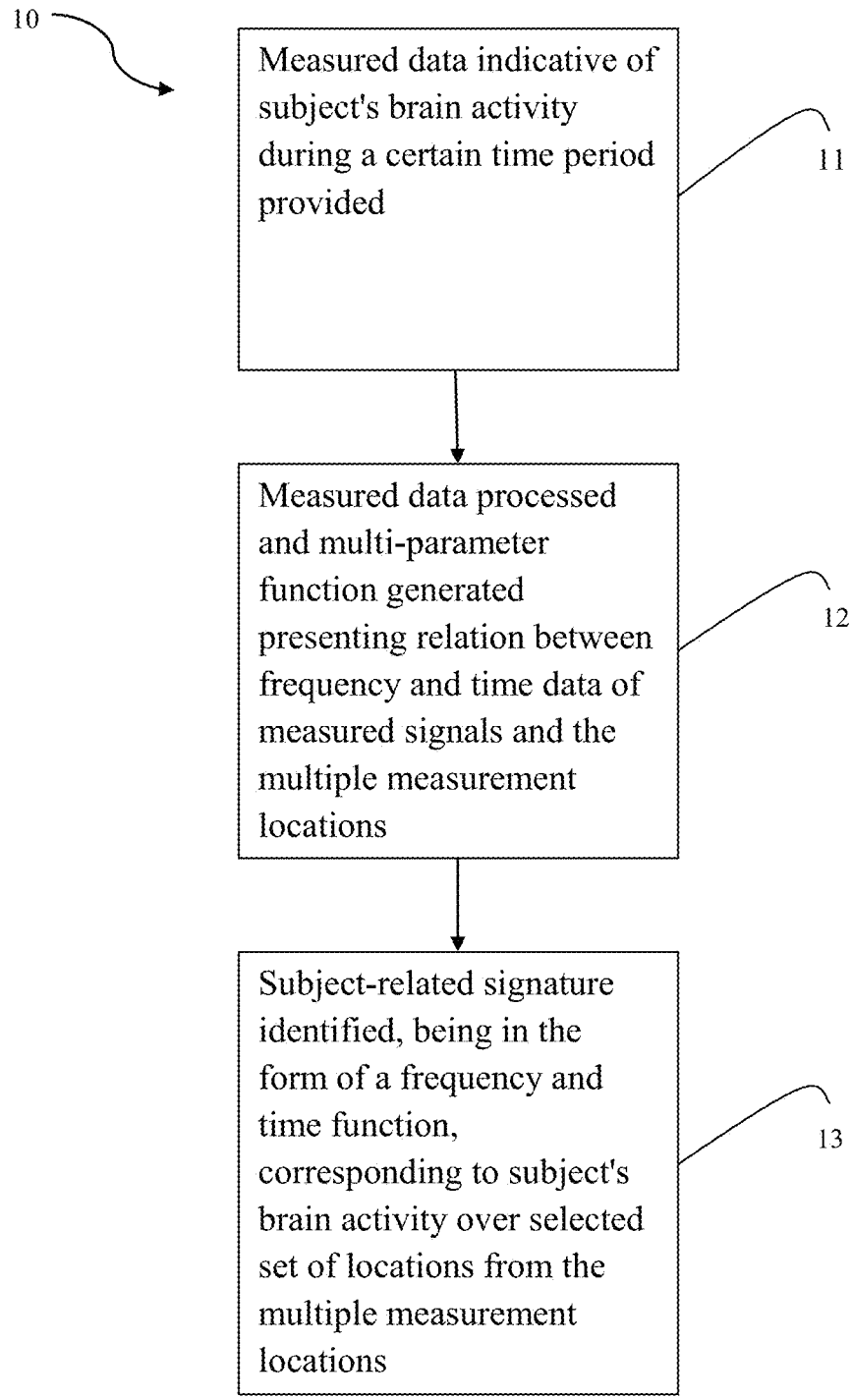
FIG. 1A is a flowchart of a method of the present invention for use in monitoring a subject's brain activity for the purposes of creation a brain activity signature.

Referring to FIG. 1A, there is illustrated a flowchart 10 of a method of the present invention for use in monitoring a subject's brain activity for the purposes of creation a brain activity signature. Measured data is provided (step 11), where the measured data includes data corresponding to signals indicative of a subject's brain activity originated from one or multiple measurement locations in the subject's brain during a certain time period. Such measure data may be provided off-line, i.e. received from a storage device, or may be provided on-line, i.e. directly from and during the actual measurements on a subject. The measured data is processed (step 12) and data indicative thereof is generated in the form of a multi-parameter function presenting a relation between frequency and time data of the measured signals and the multiple measurement locations. The so-obtained relation is analyzed (step 13) analyzed and a subject-related signature corresponding to the subject's brain neural activity is identified, being in the form of a frequency and time function over selected set of locations from said multiple measurement locations.

Figure 1B:
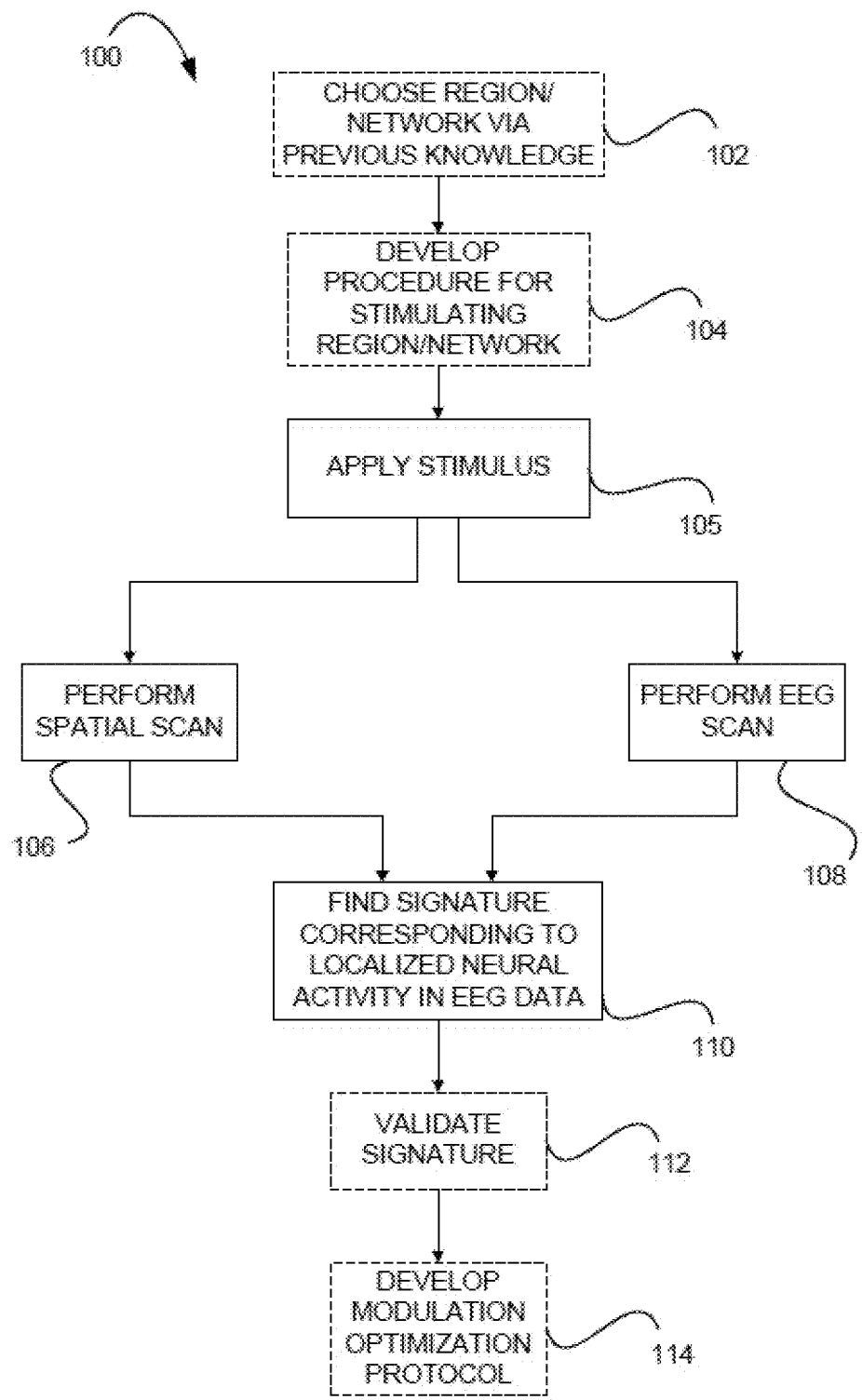
FIG. 1B illustrates a flowchart of a specific example of a method of the present invention for the brain activity signature creation.

FIG. 1B is a flowchart 100 illustrating a specific example of the above-described method for identifying a subject's related signature. In this example, measured data includes electrical measured data such as EEG data. Thus, electrical measured data is provided in the form of electrical signals measured from multiple locations along the subject's scalp (step 102). In this specific not limiting example, the measured data is provided in an on-line mode, namely while performing actual measurements. It should, however, be understood that the present invention of monitoring the subject's brain is not limited to such on-line mode, and can actually be carried out off-line by appropriately processing and analyzing measured data previously collected and stored.

Also, in this specific not-limiting example, the method utilizes measured data corresponding to a given brain condition caused by applying a certain stimulus to a subject at 105. As indicated above, the invention does not necessarily utilize such known brain condition, and not necessarily caused by application of an external stimulus, in order to create the brain activity signature. In this example, EEG measurements of a subject's brain are performed at 108 during a certain time period while under the application of the certain stimulus, and EEG data is generated. Also, in this specific not-limiting example, a separate spatial scan is of the subject's brain is performed at 106 simultaneously with the EEG measurements and second measured data is provided. The measured data (first and second measured data in this specific example) is processed to generate corresponding data in the form of a multi-parameter function presenting a relation between frequency and time data of the measured EEG signals and the multiple measurement locations. Then this function is analyzed to identify a subject-related signature corresponding to the subject's brain neural activity. The signature is in the form of a frequency and time function over selected set of locations from the multiple measurement locations.

More specifically, the measured data is processed and analyzed in order to identify one or more regions of neural activity in the subject's brain and an activity level of the one or more regions corresponding to individual functions of the brain, and generate a spatial scan data corresponding to the EEG data; and analyzing a relation between the EEG data and the spatial scan data, identifying an EEG signature at 110 for the certain brain condition (corresponding to a response of the subject's brain activity to the certain stimulus). The signature can be recorded as being indicative of a spatial neural activation of the one or more regions in the subject brain while under certain brain state/condition, e.g. caused by the certain stimulus, thereby enabling use of the recorded signature for further interpretation of a brain functional state of the subject using EEG data.

In some embodiments of the present invention, one or more regions or a network in the brain is chosen for stimulation at 102, by relying on previous knowledge about the region/network. The region/network may be a location in the brain or a functional organ of the brain. The knowledge may include a function of the region/network, a perceived need for controlling or modulating neural activity in the region/network, and/or an independent validation method for confirming neural activity in the region/network. For example's sake, if the method 100 is performed in order to improve NF, the selected region/network includes a region/network that is associated with a function the modulation of which is desirable. The modulation of limbic activity is known or believed to be controllable via NF. A typical region the modulation of which is improved via NF is the amygdala—a region involved in post-traumatic stress disorder (PTSD). A typical network the modulation of which is improved via NF is, for example, the dorsal anterior cingulated cortex (dACC), which is implicated with enhanced or reduced perception of pain.

It is known that activity of some regions or networks in the brain is associated with measurable physiological effects, such as sweat production or change of heart rate. Detection of such effects provides an independent verification of neural activity of the region/network. Optionally, the region/network chosen for stimulation is selected according to a known physiological effect associated with the region/network activation, in order to increase the reliability of data indicative of neural activity via independent verification.

At 104, a predetermined procedure for stimulating/activating the selected region/network is developed. Such predetermined procedure may include solving a puzzle, watching a movie, hearing a sound. For example, when the method 100 is performed in order to improve an anxiety-decreasing NF technique, the predetermined procedure is aimed at challenging and/or stressing the subject, in order to stimulate a region/network that is particularly active in stress or trauma situations. In such a case, the predetermined procedure may include exposing the subject stress-inducing movies and/or images, or asking the subject to solve unsolvable puzzles, for example.

At 105, one or more external stimuli are applied to the test subject. The stimuli may be applied blindly (i.e. without knowledge of what regions or networks will be activated by the stimuli), or according to the selection of region/network of step 102 and to the predetermined procedure developed at 104.

At 106, a spatial brain scan is made, in order to locate activity in subject's brain before and after the stimulation, to identify which region/network is activated by the stimulation. The spatial scan is performed via one or more medical imaging techniques capable of providing imaging characterized by high spatial resolution, in order to accurately identify the regions where neural activity is increased or decreased as a result of the stimulation.

These techniques may include, for example, magnetic resonance imaging (MRI), functional magnetic resonance imaging (fMRI), Hemoencephalography (HEG), magneto encephalography (MEG), Magnetic resonance spectroscopic imaging (MRS), positron emission tomography (PET), photoacoustic imaging, X-ray computed tomography (CT), Single photon emission computed tomography (SPECT), or ultrasound tagging of light. These techniques may be performed by placing at least one magnetic source and/or electromagnetic source and/or a sensor (infrared) in the vicinity of the scalp to measure the level of neuronal activity in the brain.

Simultaneously with the spatial scan, an EEG recording/measurement is performed at 108, in order to record electrical activity of the brain corresponding to stimulation of the region/network ROI/NOI and to provide an EEG data. This first simultaneous recording of EEG and of a spatial scan determines the first neuroimaging time point. The EEG recording may include bipolar and/or referential measurements, according to the needs/limitations of the user. At this stage, the EEG measurements are taken over a plurality of channels, each channel measuring signals between two electrodes located at different locations on the subject's scalp, on bipolar measurements, or between each channel and a reference channel, in referential measurement. The effect of the stimulus on the measured EEG signal will be stronger in electrodes closer to the activated regions or networks. The spatial scan and EEG recording begin at a predetermined time before the stimulus and end at a predetermined time after the stimulus. In this manner, the change in neural activity in due to the stimulus is detected.

Optionally, an independent non-invasive measurement of a physiological property of the subject being of a type changing in response to neural activity in the desired region/network is performed simultaneously with the spatial brain scan of step 106 and EEG recording of step 108. The measurement of the physiological response is used as a tool to provide an independent verification of the neural activity change in the desired region/network as well as additional data and parameters that may be used for the identification of the EEG signature. For example, if variation of the activity of the desired region/network is known to be associated with a change in sweat production, a measurement of skin conductance (which is indicative of sweat production) may be used in order to verify the neural activity change. If, on the other hand, variation of the activity of the desired region/network is known to be associated with a change in the subject's heart rate, then heart rate is measured (for example by electrocardiography) in order to verify the neural activity change. This verification step may increase accuracy in the interpretation (brain state) of the data acquired in the spatial brain scan of step 106.

Optionally, the measuring/scanning steps 106, 108 are repeated for different stimuli, in order to obtain different pieces of data. Each piece of data pertains to the activation of one of a plurality of regions/networks in the subject's brain. The measurements and analysis may be performed on a plurality of subjects and creating a database of EEG signatures per a plurality of stimuli.

At 110, EEG data obtained as a function of time and of a specific stimulus at 108 is analyzed, in order to identify a signature indicative of neural activity at the region/network as a response to the given stimulus. The signature characterizes a correlation between the EEG signal and the spatial brain activity in response to the stimuli. The signature depends on the region/network of the neural activity and enables to determine a fingerprint of a specific subject for a specific stimulus.

Optionally, in order to extract a reliable signature from the analysis of 110, the analysis is to be based either on repeated measurements (106, 108) performed on a single subject, or on measurements (single or repeated) performed on a plurality of subjects. The choice of whether to use one subject or a plurality of subjects in the method 100 is made according to a user's necessity (such as time constraint, or availability of equipment), and according to a degree of variance in the signature among a plurality of subjects. More specifically, if a signature is observed to reliably indicate neural activity at a specific region/network for one subject but not for other subjects, it may be the case that such signature is an individualized signature for the single subject, and measurements on other subjects may be superfluous. On the other hand, another signature may be observed to vary within an acceptable range for a plurality of subjects, and to be associated with a neural activity of a specific region/network common to the plurality of subjects. In such a case, it may be inferred that this signature is common to many, and measurements performed on a plurality of subjects may increase the reliability of the signature calculation.

The measurements (106, 108) may be performed for a single region/network, or for a plurality of region/network, according to a user's need. If measurements are made relating to activation of different regions/networks for different stimuli, a database may be created, which will enable a comparison between EEG data associated with neural activity in each of a plurality of regions/networks for each stimulus, and the recognition of a plurality of suitable signatures, each signature corresponding to neural activity in a specific region/network for a specific stimulus. When multiple signatures are determined, such that each signature corresponds to neural activity at a specific region/network for a specific stimulus, a three-dimensional brain map may be constructed to relate EEG scan data to spatial and/or functional scan data and stimulus type. The map may be an individual map relating to a single test subject or a common map relating to a plurality of test subjects (and optionally extrapolated to relate the entire species of the test subjects). This map may be useful for performing practices in which the knowledge of the neurally active regions and/or knowledge of the stimuli inducing activation of such regions in the brain is necessary or desirable, while reducing the need for cumbersome and costly spatial scanners. Such a practice is, for example, NF, which is generally performed via EEG measurements or spatial scans. The map may be useful for decreasing of the need for the spatial scan technique, and may enable a user to perform NF with EEG measurements alone (after a preliminary fMRI/EEG session for determining the signatures), using signatures in EEG data to determine which regions or networks are neurally active during the measurement. Alternatively, the map may be used for performing an indirect spatial brain scan via EEG measurements, and replace expensive and cumbersome spatial scanners, at least for some diagnostic techniques.

Optionally, after the signature has been obtained, a validation of the signature is carried out at 112 defining a second neuroimaging time point. The validation includes applying the stimulus of step 105, and repeating an independent spatial scan of 106 simultaneously with the EEG measurement of 108 (and optionally the independent verification), in order to ensure that the signature determined at 110 reliably corresponds to the stimulus and to neural activity at the region/network activated. If the signature extracted from results of the validation measurements is similar to the signature extracted at 110, and corresponds to an activation of the same region or network in the brain, then the signature is deemed reliable.

In the event that the signature is determined for the purpose of performing NF via EEG measurements alone, where each signature in EEG data is used to determine the region/network of neural activity and/or a stimulus causing such activity during the measurement, a protocol for improving brain modulation in NF is developed at 114. The NF procedure is guided by the EEG and is tested against the limbic activation visualized via the spatial scan images. In such a protocol, a set of training repeated sessions is included in a third neuroimaging time point, in order to teach a subject to modulate one or more specific regions/networks of the brain. A modulation of at least one parameter of an EEG signature is identified under the application of the certain stimulus, corresponding to a functional state of the subject's brain at which one or more regions are at a desired activity level. The subjects are trained to regulate the activity of target brain areas via feedback. The modulation is detected by extracting the signatures corresponding to a stimulus and a subsequent activation of the regions/networks, and comparing the extracted signatures to signatures corresponding to a desired modulation (different degree of activity) of the specific regions/networks achieved by a given stimulus. The development of this modulation optimizing protocol includes determining the signatures corresponding to states at which specific regions/networks are at a desired activity state. The identification of the signature enables to select EEG signals indicative of a specific brain functional state. In this manner, a comparison between one or more signatures extracted from the EEG data measured during an NF session and the corresponding signature or signatures corresponding to the desired state of specific region(s)/network(s) will indicate whether the desired modulation has been achieved by the subject, enabling to determine a psychological evaluation.

In a specific and non-limiting example, the experimental data may be acquired as follows: the brain scanning is performed on a 3T (GE, HDXt) MRI scanner with 8-channel head coil. The structural imaging is acquired by a 3D spoiled gradient (SPGR) echo sequence with high-resolution 1-mm slice thickness (FOV: 25*18; matrix: 256*256; TR/TE: 7.3/3.3 ms). Functional imaging (fMRI) is acquired with gradient echo-planar imaging (EPI) sequence of T2*-weighted images (TR/TE/flip angle: 3,000/35/90; FOV: 20*20 cm1; matrix size: 64*64) divided to 44 axial slices (thickness: 3 mm; gap: 0 mm) covering the whole cerebrum. fMRI data preprocessing includes correction for head movement, realignment, normalizing the images to Montreal Neurological Institute (MNI) space, and spatially smoothing the data (FWHM: 6 mm). In addition, a set of harmonics is used to account for low-frequency noise in the data (1/128 Hz), and the first six images of each functional scan are rejected to allow for T2* equilibration effects. fMRI data analysis is done by SPM5 or Brain Voyager 1.10 following General linear model or data driven approach. The continuous EEG data is recorded simultaneously with fMRI acquisition throughout the experimental sessions. EEG is collected using an MR-compatible system including a 32-channel BrainCap electrode cap with sintered Ag/AgCl ring electrodes (30 EEG channels, 1 ECG channel, and 1 EOG channel; Falk Minow Services, Herrsching-Breitbrunn, Germany), and BrainAmp-MR EEG amplifier (Brain Products, Munich, Germany). Raw EEG is sampled at 5 kHz and recorded using Brain Vision Recorder software (Brain Products). EEG analyses are with EEGLAB 6.01 software package (Schwartz Center for Computational Neuroscience, University of Calif., San Diego), MATLAB software and FMRIB plug-in for EEGLAB. Preprocessing of the EEG data consists of MR gradient artifacts removal using a FASTR algorithm and Cardio-ballistic artifacts removal.

An optimized rt-fMRI (real-time fMRI) system includes state-of-the-art acquisition and analysis methods aimed at improving the accuracy of rt-fMRI signal measurement for learned regulation of brain activation. In fMRI, accurate signal measurement is compromised by low SNR, motion, and EPI artifacts. These concerns are more acute for rt-fMRI because analyses must be performed continuously on small increments of data (as opposed to an average over an entire experiment) and must be computed rapidly. rt-fMRI analysis is improved by online artifact rejection in the GLM and a newly developed method for estimating rt neural activations in a single volume. The following processing will take place online:

Artifact Detection and Rejection-Detecting and accounting for time-series artifacts during self-regulation experiments is significant to avoid providing the subject with inaccurate feedback. Ideally, volume to volume changes in fMRI data intensity would only be observed in the presence of changing neural activity. Subject motion is a prominent source of artifact in fMRI time series that can substantially degrade signal quality. Even small head motion can cause artifacts in activation estimates, particularly when the motion is correlated with the experimental paradigm73 74. The rt-fMRI activation analysis is based on a novel GLM-based rt analysis method that is based on a single volume estimation.

In some embodiments, the signature comprises a regularized logistic classifier enabling to select and optimize regularization parameters improving spatial/temporal features for a given stimulus. As described above, the regularization parameters may be selected from a position of a least one pair of relevant electrodes on the subject's scalp; and for each pair of electrodes, relevant frequency bands in the EEG spectral data for a specific external stimulus; a frequency of the neural signal after the application of the stimulus, a maximal amplitude of the neural signal after the application of the stimulus, and at least one time point indicative of the best predicted mental state of the brain at which a change in frequency and/or in maximal amplitude is detected after the application of the stimulus.

In a specific and non-limiting example, the determination of the signature in step 110 is performed via machine learning-based model interpretation, which includes two models: (i) a localization model in which localization of relevant electrodes and time points is provided; and (ii) a frequency identification model in which inference of most relevant frequency bands for a specific stimulus is provided. The optimization of the model comprises determining a set of EEG measurement locations from which a part of the EEG data is measured corresponding to one or more regions responding to the stimulus by neural activity and determining time points of measurements corresponding to the response to the stimulus. The validation of the signature in step 112 is performed by: (iii) using the EEG limbic modulation index to monitor limbic activity modulation; and (iv) performing beam forming analysis to the EEG data.

The localization of relevant electrodes and time points may be based on a machine-learning-based method able to distinguish between brain states using EEG data from single trials. The brain functional state's category is defined according to the level of the activation in the fMRI images. This task is complicated by the different time-frequency resolution of EEG and fMRI.

The localization of relevant electrodes and time points may be performed using any suitable known technique. The following are two specific but not limiting examples of such techniques:

I. A logistic regression classifier is trained to predict the state of the subject. This technique describes the relationship between response variables Y to some explanatory variables X. The response variable has only two possible outcomes: event, denoted by 1 and non-event, denoted by 0.

The logit (log odds) of the logistic regressions' model is given by $$g(x) = w_0 + w_1 x_1 + w_2 x_2 + \ldots + w_p x_p \quad \text{(eq. 1)}$$

where $w_0, w_1, \ldots w_p$ are the parameters of the model.

The odd of an event is defined as the ratio of the probability that an event occurs to the probability that it fails to occur:

$$P(Y=1|x) = \pi(x) = \frac{e^{g(x)}}{1+e^{g(x)}} = \frac{1}{1+\exp(-yw^T x)} \quad \text{(eq. 2)}$$

$$\text{odds}(Y=1) = \frac{P(Y=1)}{P(Y=0)} = \frac{\pi(x)}{1-\pi(x)} = e^{g(x)} \quad \text{(eq. 3)}$$

An alternative form to write the model is as the function of the logit transformation:

$$\text{logodds} = \log\left(\frac{\pi(x)}{1-\pi(x)}\right) = g(x) \quad \text{(eq. 4)}$$

Estimation of the coefficients $w=(w_0, w_1, \ldots, w_p)$ is often done using Maximum Likelihood Estimation (MLE), which seeks to maximize the log likelihood over the entire observed data:

$$l(w) = \sum_{i=1}^n \log P(Y=y_i|x_i) = -\sum_{i=1}^n \log(1+\exp(-y_i w^T x_i)) \quad \text{(eq. 5)}$$

For proper estimation and comparison between models of different complexity, an additional regularization (penalty) function is used. A Matlab-based MVPA toolbox may be used to implement regularized logistic regression. The regularized version of the logistic regression algorithm seeks to find w which maximizes the equation:

$$l^\lambda(w) = l(w) - \frac{\lambda}{2} w^T w \quad \text{(eq. 6)}$$

The regularization also comes to solve a potential ill-posed problem due to a small amount of training data, and preventing over fitting. The accuracy of the classifier will be tested using rn-k-fold cross validation. The original data is partitioned into k disjoint sets, where a single dataset is retained for test, and the remaining k−1 disjoint datasets are used for training the model. The cross-validation process is then repeated k times, with each of the k sets used exactly once as the test data. The whole process is repeated m times. In each training stage, the data is randomly split into n training and validation sets. For each such split, the training set to find the best model was used and its optimal regularization parameter λ (within the range of interest), which bring the prediction error to minimum. The predictive accuracy of the model is assessed using the validation set. The results are then averaged over the splits.

After a model is chosen from a family of models, an error of the model is calculated using the test set as the number of wrongly predicted samples divided by overall number of samples.

This technique was applied on EEG signal using fMRI labels acquired simultaneously. A healthy subject was presented with pictures of faces in either the right or the left visual fields. The fMRI labels were taken from the right visual cortex then a threshold was applied on it. The 50% higher labels were considered as left faces (1) and the other were considered right faces (0). A set of N trials labeled data samples was obtained, each trial was represented by $N_{ch}$-by-$N_{tps}$ signal matrix, where $N_{ch}$ is the number of channels and $N_{tps}$ is the number of time sampling points in the segmented interval. The outcome of the classifier was compared for different time points and the time point which best predicted the mental state of the brain (i.e. left or right face) was selected.

II. A ridge regression classifier is trained to predict the state of the subject. This technique also describes the relationship between response variables Y to some explanatory variables X.

Ridge regression is appropriate for a linear relationship and it seeks w which minimizes the following expression:

$$\|y - Xw\|^2 \quad \text{(eq. 7)}$$

Regularized ridge regression adds a regularization term λ to eq. 7 to determine the bias/variance trade-off.

$$\|y - Xw\|^2 + \lambda \|w\|^2 \quad \text{(eq. 8)}$$

A family of models is constructed, with different combinations of electrodes, frequency bands, time delays and model constraints. Then, a smaller collection of optimal models is selected using classical robust statistics methods for model selection and validation. These include cross validation and regularization at several levels of the feature extraction.

Two model evaluation strategies are applied:

The first uses normalized mean squared error (NMSE) to measure the similarity between the target signal and the predictor. If the NMSE is less than 1, then the prediction is doing better than the series mean.

$$NMSE = \frac{MSE(x)}{VAR(x)} = \frac{\sum_{i=1}^n (x_i - y_i)^2}{\sum_{i=1}^n (x_i - \bar{x})^2} \quad \text{(eq. 9)}$$

The second evaluation strategy uses Pearson's correlation to measure similar behavior instead of similarity.

$$\rho_{x,y} = \text{corr}(X, Y) = \frac{E[(X-\bar{X})(Y-\bar{Y})]}{\sigma_x \sigma_y} \quad \text{(eq. 10)}$$

This technique was applied by the inventors to predict the amygdale activity from EEG measurements. The activity of the amygdale was altered by requesting subjects to become relaxed. They received a sound feedback indicating their relaxation state as measured by their theta/alpha activity.

It is generally believed according to previous studies published that relaxation causes a decrease in the Alpha waves and an increase in the Theta waves. As a result the Theta-Alpha ratio should increase as the person relaxes.

Since the EEG and the fMRI have different resolutions and shift in time due to the hemodynamic response, usually the EEG is convolved with the canonical HRF function and down-sampled to the fMRI resolution.

Following preprocessing, which removes artifacts that are acquired during data acquisition, the higher temporal resolution data was down-sampled, while the lower temporal resolution data was up-sampled. The EEG data was then transformed into a detailed time-frequency representation using the Stockwell transformation.

The inventors demonstrated that a time-frequency representation of EEG data can predict the amygdale activity better than the traditional theta/alpha measurement that is convolved with the canonical HRF.

Figure 2A:
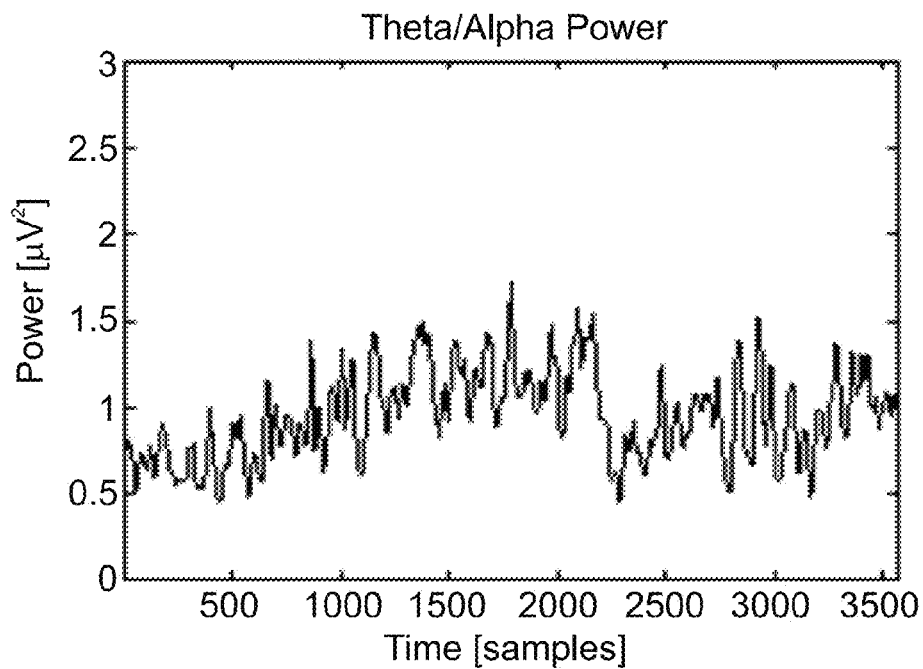
FIGS. 2A-2F illustrate results of an experiment performed by the inventors.

The results are shown in FIGS. 2A-2F. FIG. 2A shows the theta-alpha ratio variability. In the figure, Y-axis corresponds to the EEG power in $\mu V^2$, and X-axis corresponds to the time in samples, each sample being of 0.25 seconds. To get this ratio, the time-frequency EEG data was convolved with the canonical HRF and down-sampled to 4 Hz. The theta range taken was [4:7 Hz] and the alpha range taken was [8:13 Hz]. The frequency bands were averaged over three selected electrodes which achieved the highest ratio (i.e. averaged theta power over averaged alpha power). As can be seen, FIG. 2A depicts an increase in Theta/Alpha EEG power ratio.

Figure 2B:
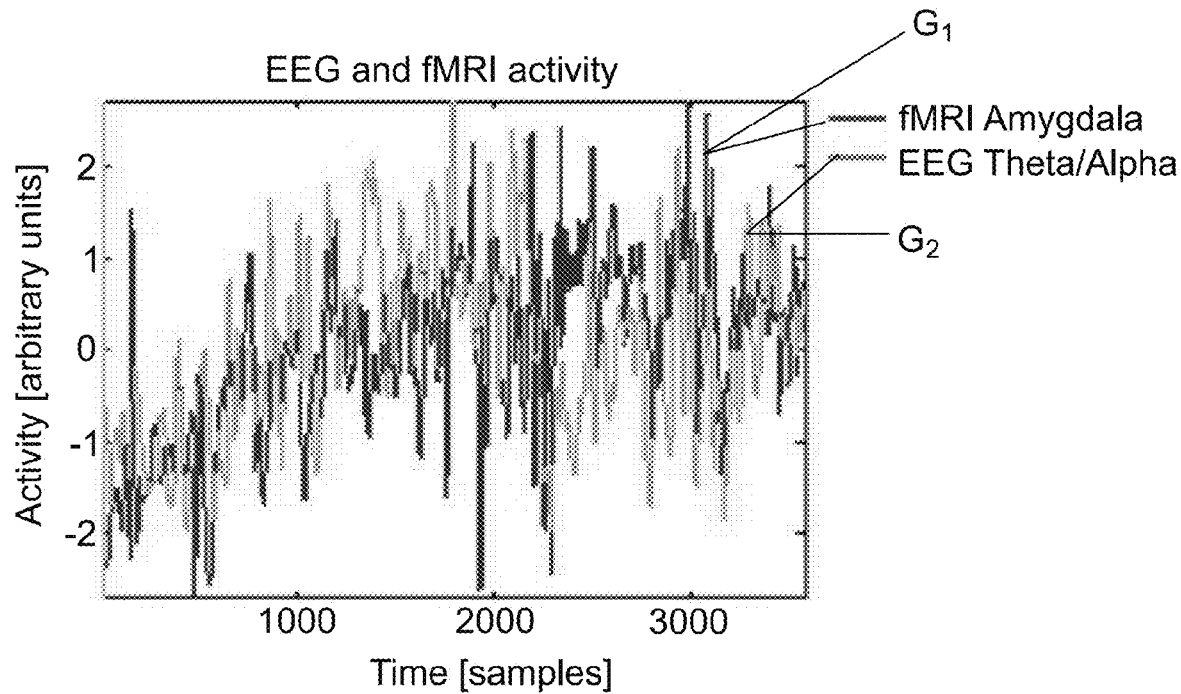

FIG. 2B shows the fMRI signal taken from the right amygdale (graph $G_1$), compared to the Theta/Alpha EEG signal (graph $G_2$). Both signals were normalized to arbitrary units for the purpose of demonstration. The fMRI signal was up-sampled also to 4 Hz. As said above, the inventors used EEG to predict the Amygdale signal seen in the fMRI. Activity which can be seen in the fMRI signal in time T, can be predicted using the intensity of frequency F of electrode C in delay D from T. This figure shows a high correspondence between the fMRI signal and the EEG signal, indicating that the task of increasing alpha/theta ratio as performed by the subject activated the amygdala as seen by fMRI.

Figure 2C:
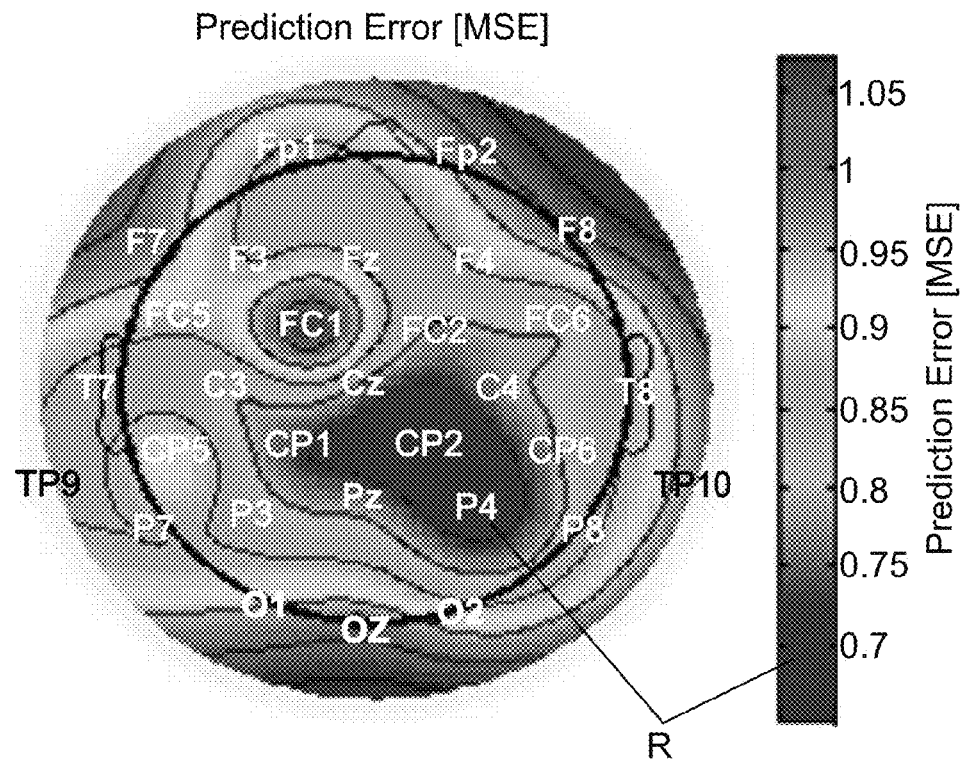

FIG. 2C shows the prediction results in different electrodes. EEG was recorded using a 32 electrode array. The prediction model was fitted to each electrode separately, yielding a prediction error for each electrode, measured in terms of NMSE (normalized mean squared error), the values in the lower region R of the ruler indicate good prediction strength. This map may indicate the activated areas during the relaxation process. As it can be seen, Electrode CP2 achieved the lowest error across validation sets. From this it may be concluded that this electrode contains much of the relevant information needed to make a good prediction of the relevant fMRI signal.

Figure 2D:
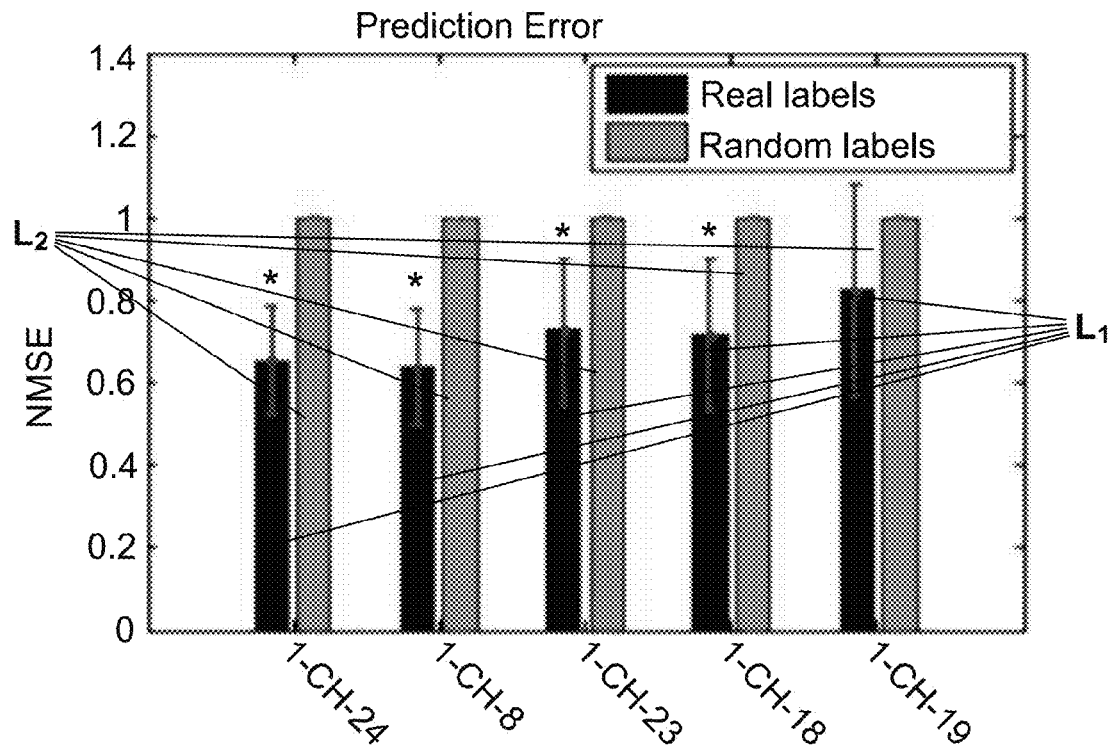

FIG. 2D shows prediction results (NMSE) on test sets (real labels $L_1$) for best 5 electrodes found on the validation sets. The results were compared to results using the same algorithm on randomly scrambled labels $L_2$, i.e. the target function for prediction was a randomly scrambled version of the true fMRI signal. This figure demonstrates that prediction error with random data is maximal, indicating that the classifier is not biased and does not over-fit the data. The results suggest that a ridge regression model which is based on time/frequency representation of EEG can predict the amygdale activity significantly better than chance.

Figure 2E:
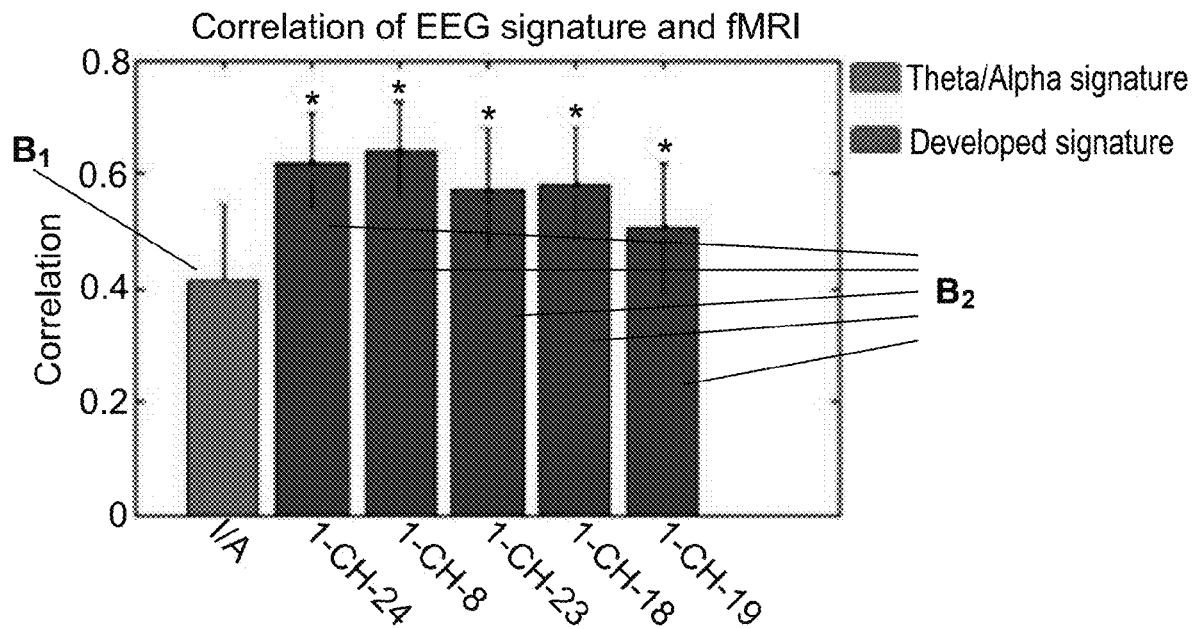

FIG. 2E shows prediction results (correlation) of the predictor found using ridge regression compared to the standard Theta/Alpha predictor (bar $B_1$) (on test sets). It can be seen that the prediction results were improved related to Theta/Alpha. Specifically, the graph shows the correlation coefficient between the signature as derived from various EEG electrodes (bars $B_2$) using a ridge regression model and the fMRI activity, and correlation between theta/alpha power and fMRI activity (bar $B_1$). This graph suggests that the derived signature has higher correlation to the fMRI data than the standard theta/alpha signature.

Figure 2F:
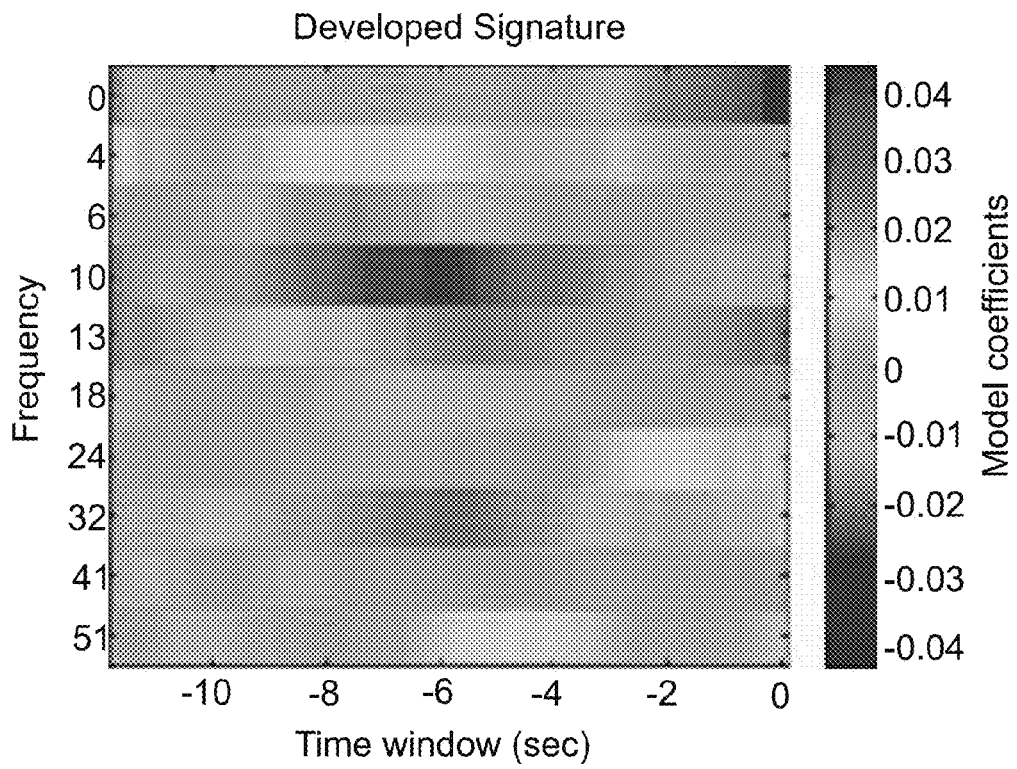

FIG. 2F shows ridge coefficients for each frequency band and shift of the best electrode (the one that achieved the minimal NMSE on the validation sets). This map may indicate relevant frequencies and specific time delays of the activity which constitute a model for a signature. Specifically, each value in the matrix plot represents a value of the weight (coefficient) vector w from eq. 8. Each row of the matrix plot represents a frequency band used in the time-frequency representation (X from eq. 8) of the data. Each column in the matrix plot represents a specific time shift of the time-frequency representation of the data. This figure can be considered as an example of graphical representation of the derived model for the EEG signature of the amygdala fMRI.

The results showed that the obtained prediction is significantly better than chance and prediction improvement that can be achieved with the traditional theta/alpha measurement. In addition, map of the prediction results in different electrodes may indicate the activated areas during the relaxation process and ridge coefficients for the best electrode may indicate relevant frequencies and specific time delay of the activity.

This experiment demonstrated that it is possible to improve the spatial resolution of EEG and consequently, to improve the temporal resolution of concurrent EEG/fMRI. The spatial resolution improvement does not require many electrodes, and may be adapted to individual subjects.

The frequency identification model determining the inference of most relevant frequency bands for a certain brain condition (e.g. in response to a specific stimulus) may be performed as follows:

The EEG temporal data is first processed by, for example, applying a Fourier transform to provide an EEG spectral data. The frequency identification model includes the development of a regularized logistic regression classifier to identify frequencies in the EEG spectral data in which most of the EEG signal's variance occurs during a given stimulus. This classifier determines the linear combination of frequencies, which contribute most to the EEG signal during each of the states, according to eq. (1), where x is a matrix of time frequency transform of the signal from one EEG electrode.

The frequency identification model parameters are the weights of the frequency contribution to the prediction. The response variables (i.e. the predicted labels) are the fMRI activity of one or more regions. The relevant electrode for this regression is selected according to the electrode coefficients resulting from the localization model described above. Preliminary results have shown unique features in the EEG frequencies to a stimulus being in the present example an experimental task of eyes open or close under light and dark conditions.

In an experiment performed by the inventors, 10 subjects performed a simple eyes opening and closing task in blocks of 30 sec for 3 minutes, designed to trigger alpha waves in the EEG (Berger effect). This experiment was performed under room light and dark conditions. Time-frequency decomposition of the EEG signal from one electrode, calculated by using Stockwell transform was used as input to the classifier. A logistic regression classifier was trained to predict the state of the subject (opened or closed eyes) and its optimal frequency features where estimated by using cross validation. Performance of the classifier was estimated again with cross validation procedure.

In this example, the frequency identification model includes the classifier's performance at each electrode serving as a spatial localizer of information relevant to the stimulus/task. Frequency weights of the prediction under light conditions show a large contribution of the alpha band (8-14 Hz) to the prediction, as expected from the Berger Effect, but additional frequencies other than alpha contribute significantly to the prediction. Frequency weights of prediction under darkness condition show contribution of the alpha band to the prediction. The location of electrodes with lowest prediction error was proved to be different from the one under light conditions, and it was mostly frontal. This diverse localization and distribution of frequencies may suggest two distinct brain mechanisms operating under the different light conditions.

The validation of the signature may be performed by using the EEG limbic modulation index to monitor limbic activity modulation as follows:

The localization and frequency of model's parameters, which have been obtained with the techniques described above, may be used to determine the functional brain level in real time, from an EEG recording and return a feedback to the subject. Specifically, a combination of electrodes determined by the localization model is used as an input to the frequency identification model. This frequency identification model is trained to predict limbic system activity. The output of this model is a model of frequency weights, and these weights are applied to EEG frequencies estimated in real time during the NF experiment. This can give an EEG index of limbic activity (signature) in real time, and may be used for feedback to the subject during the NF. The inventors have demonstrated a set of numerical models, which enable a robust model interpretation (brain state) from single trials, finding relevant EEG electrodes, temporal location and spectral band of the response, enabling to obtain an accurate (individually based) brain functional index of a subject.

The validation of the signature may be performed by performing beamforming analysis of the EEG data as follows:

The source estimation is done by the Fieldtrip software package. This approach is best applied in the frequency domain, but time domain applications also exist. Coherence information and connectivity data are readily available for any EEG time series that is statistically stationary (ongoing and with a stable covariance matrix over time). Generally, these analyses are clearly superior—both in terms of reliability and spatial specificity, to other more commonly used methods.

Figure 3:
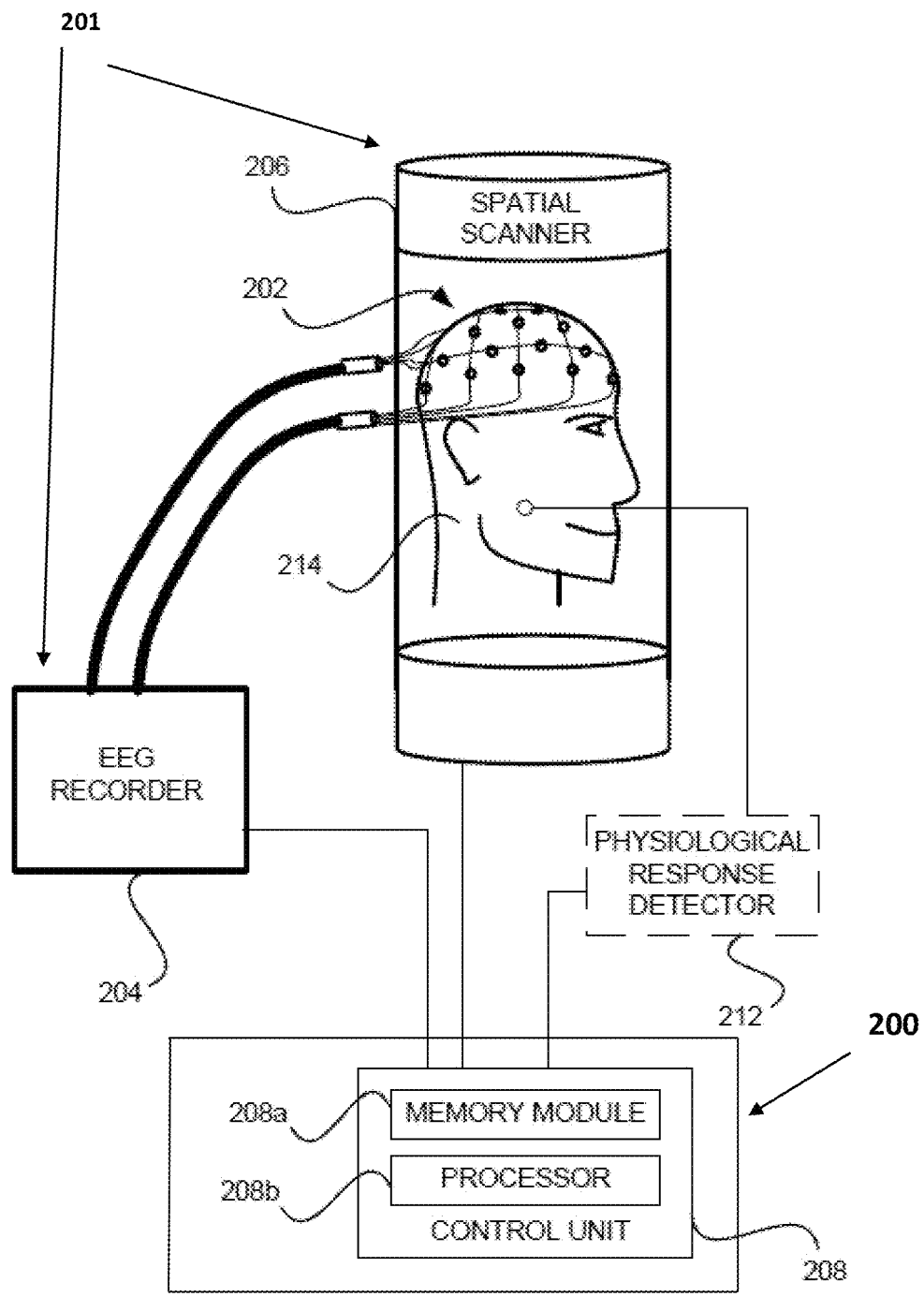
FIG. 3 is a schematic drawing illustrating a possible configuration of the system of the present invention for use in the determination of the signature in the EEG data.

Reference is made to FIG. 3 showing schematically a system 200 of the invention for use in monitoring a subject's brain activity to determine the brain activity signature.

The system 200 includes a control unit 208 which is typically a computer system utilizing inter alia a memory module 208a and a processor utility 208b, and also including data input and output utilities (not shown). The control unit 208 is connectable (via wires or wireless signal transmission) to a measured data collecting device 201, which may be a measurement device itself or a separate storage device. In the present not limiting example, the measured data collecting device 201 is constituted by the measurement device, which in this example includes an EEG electrodes' arrangement 202 in communication with an EEG recording device 204, and a spatial scanner 206.

It should be noted that the control unit of the present invention provides a novel configuration. Such control unit may be a stand-alone device or may be mounted with any system of any type if needed including the configuration of the present invention.

In some embodiments, the control unit 208 is configured and operable for creating a database for use in analyzing brain activity of a subject. The control unit 208 comprises a data input utility (not shown) and a processor utility. The data input utility is configured for receiving measured data comprising data corresponding to signals indicative of a subject's brain activity originated from multiple measurement locations during a certain time period. The processor utility is preprogrammed for processing the measured data and generating data indicative thereof in the form of a multi-parameter function presenting a relation between frequency and time data of the measured signals and the multiple measurement locations. The processor utility is further adapted for analyzing this relation and identifying a subject-related signature corresponding to the subject's brain neural activity, where the signature is in the form of a frequency and time function over selected set of locations from the multiple measurement locations.

In the specific but not limiting example, the measured comprises EEG data (first measured data) and spatial scan data (second measured data) simultaneously measured on brain of a specific subject. The data processor utility 208b is configured for processing the measured data, determining a relation between the EEG data and the spatial scan data, and determining one or more EEG signatures indicative of a certain spatial neural activation as corresponding to one or more regions in the subject brain, thereby enabling use of the one or more signatures for further interpretation of a brain functional state of subjects by using EEG data.

Optionally the system 200 further includes a physiological measurement device 212. The control unit 208 is also configured to control and optionally synchronize an operation of each of the above elements of the system 200. As indicated above, the control unit 208 may also include a memory unit 208a for storing data.

The EEG electrodes' arrangement 202 is configured and operable for being disposed on the scalp of a subject 214, detect electrical signals emitted by neural activity of the subject's brain, and convey the measured signals to the EEG recording device, where the signals are stored, and processed into EEG data. Generally the processing includes matching the signal amplitude with the time of detection, in order to obtain a waveform of the signal amplitude as a function of time. The EEG data is sent to the control unit 208.

The spatial scanner 206 is configured and operable to generate at least one image of the subject's brain, where regions of neural activity are differentiated from regions where no neural activity is present. Spatial scanners suitable for this may include fMRI scanners, MEG scanners, HEG scanner, PET scanners, CT imaging devices, SPECT imaging devices, or imaging devices based on ultrasound tagging of light, for example. Images generated by the spatial scanner 206 are also sent simultaneously to the control unit 208.

The control unit 208 is configured and operable for receiving EEG data from the EEG recorder 204, and an image indicative of the region or network of neural activity of the subject's brain from the spatial scanner 206. All the received information is processed by the processor 208b of the control unit 208 in order to analyze the EEG data and find therein a signature that corresponds to the active neural region/network of the subject's brain. The processing may be performed in real time, i.e. shortly after the information has been received, or the information may be stored in the memory module 208a, for later processing.

Optionally, a physiological measurement device 212 is present for detecting a physiological response associated with a change of neural activity at a specific region or network in the subject's brain. The physiological measurement device 212 is used as an additional tool, in order to verify neural activity in a region or network of the subject's brain or to improve the identification of the EEG signature. The detector 212 may include, for example, an electrocardiography (ECG) device designed for measuring the heartbeat of the subject 214, and/or a skin conductance measurement device designed for measuring moisture in the subject's skin (and therefore the production of sweat by the subject 214). The measurements taken by the detector 212 are sent to the control unit 208.

An output interface may be used in order to apply a stimulus to the subject 214. The output interface may include a screen for displaying text, an image, or a movie to the subject 214. Optionally or alternatively, the output interface may include a speaker or earphones for conveying a sound to the subject 214. The subject's reaction to the stimulus is recorded in the EEG recorder 204, the spatial scanner 206, and the physiological measurement device 212, if present. It should be noted that a stimulus may be applied to the subject 214 in other manners, which do not necessitate the output interface. These manners may include, for example, asking the subject to solve a complex or unsolvable mathematical/logical problem within a given time. As explained above, in reference to FIG. 1B, the stimulus is aimed at triggering neural activity in a predetermined region/network of the subject's brain.

In some embodiments of the present invention, the system 200 is programmed to apply different stimuli at different times, according to a predetermined procedure (as mentioned above, in reference to FIG. 1B). This enables a generation and analysis of data corresponding to the activation of different regions/networks in the subject's brain, and therefore enables an increase in the amount of data generated within a session with the subject 214. In these embodiments, the output interface may be controlled by the control unit 208 to convey to the subject 214 different stimuli at different times, according to the procedure.

Figure 4:
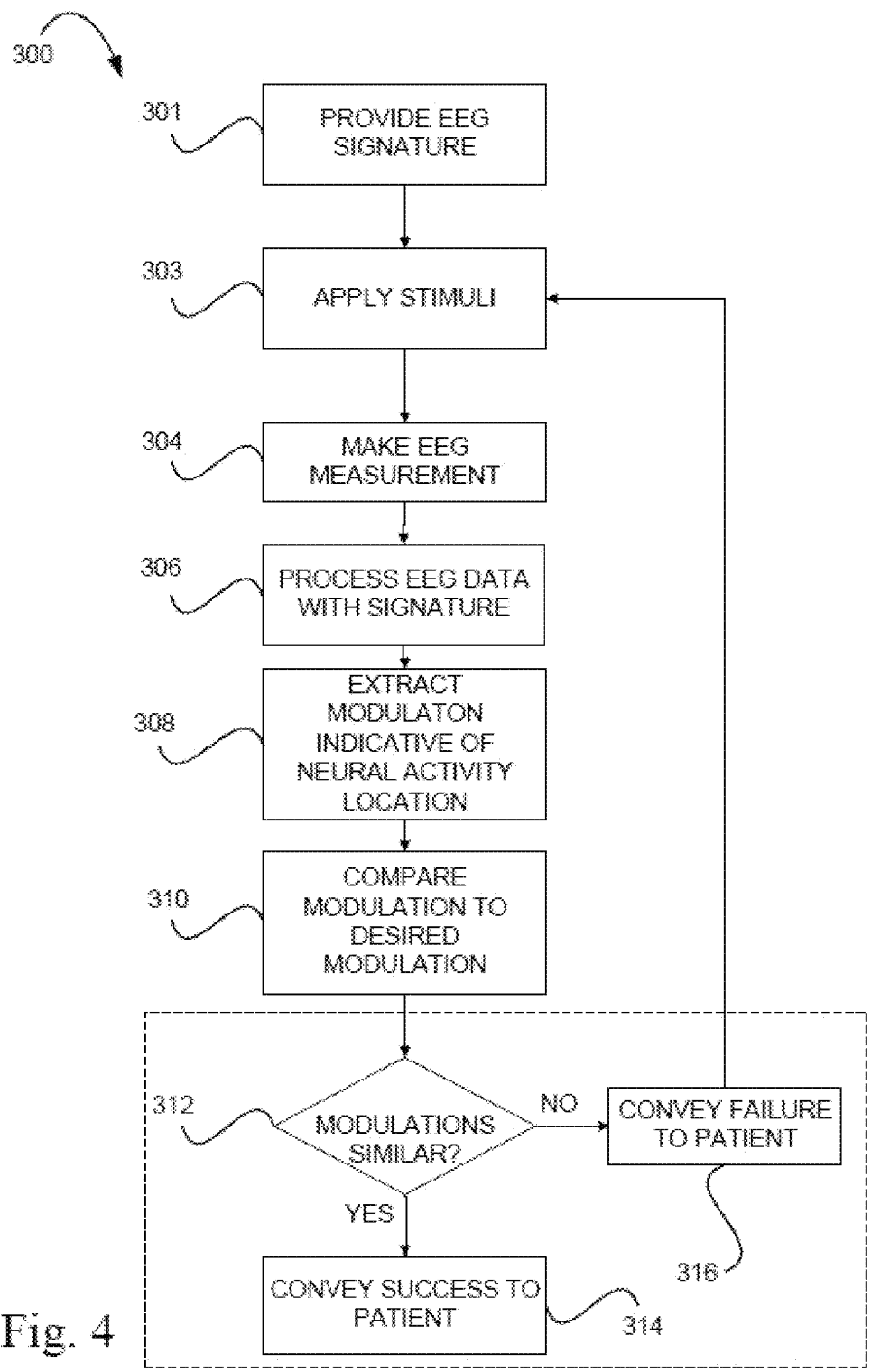
FIG. 4 is a flowchart illustrating an example of a method of the present invention used in a NF session.

FIG. 4 is a flowchart exemplifying a method 300 for use in performing an exercise of a NF session, in which a region of neural activity is indicated by a signature extracted from EEG data. Feedback of a change in the activity of the region is given to the subject in real time. The method 300 comprises providing a predetermined EEG signature corresponding to a certain stimulus at 301; applying the stimulus to a subject to activate the one or more brain regions at 303; performing an EEG measurement on the subject's brain at 304 while under the application of the certain stimulus, and generating EEG data thereof; processing the EEG data using the predetermined EEG signature at 306 to identify one or more parameters indicative of neural activation of the one or more regions by the given stimulus, and selecting from the EEG data EEG signals related to the neural activation.

To identify the EEG signature, the above described method and system (FIGS. 1A-1B and 3) may be used. The signature identification/creation method may thus be a preliminary session performed for each subject before step 303, for the purpose of determining one or more signatures. In another variant, in the event that the signatures are common to a plurality of subjects, the comparison relies on a database of signatures previously extracted from a plurality of subjects. As described above, the predetermined EEG signature is indicative of a spatial neural activation of one or more regions in a subject's brain corresponding to individual functions of the brain while under the certain stimulus and thus corresponds to a predicted certain activity state related to a given stimulus.

At 304, an EEG measurement of the subject's neural activity is taken via an EEG electrodes' arrangement, and may be recorded in an EEG recorder. The EEG measurement is made continuously starting before the instruction to the subject and ending at a predetermined time after the instruction has been made, in order to detect a change (if any) in the neural signals brought about by the subject's attempt at modulation, and in order to collect enough EEG data for enabling a processing thereof.

At 308, a modulation of limbic activity indicative of the region or network in the brain at which neural activity is present is extracted from the processed EEG signals. At 310, the modulation extracted at 308 is compared to a desired modulation of the subject's brain corresponding to the predicted certain activity state. The desired modulation may correspond, for example, to a relaxed state of the subject. At 312, a degree of correlation between the modulation of limbic activity and the desired modulation of limbic activity is then obtained to enable to determine a psychological evaluation of the subject. If the degree of correlation is high, such as, but not limited to, significant person correlation coefficient, then a success message is conveyed to the subject at 314. If the degree of correlation is low such as insignificant person correlation coefficient, then a failure message is conveyed to the subject at 316, and optionally, the stimulus is applied again on the subject at 303. The success and failure messages may be conveyed to the subject via an image, a video, or an audio signal.

As mentioned above, the signature in the EEG data corresponds not only to a region or network of activity in the subject's brain, but also to a stimulus causing such an activity. In some embodiments of the present invention, it is possible to identify a cognitive state of the subject's brain corresponding to either a desired or an undesired functional state. In such an event, NF may be used to help the subject to either strengthen a desirable self-applied impulse, or to weaken an undesirable self-applied impulse, in order to reach a desired modulation of the subject's brain.

Optionally, an internal check subprocess is included in method 300. Simultaneously with the EEG measurement, a physiological property of the subject is also measured, to verify a change of neural activity at predetermined regions or networks in the subject's brain. As mentioned above, the physiological property may include, for example the subject's heartbeat (measured, for example, via ECG), and/or the subject's sweat production (detected, for example, via a measurement of the subject's skin conductivity).

Optionally, the region(s) or network(s) of neural activity in the subject's brain is identified, by referring to the map created via the above-described method of signature creation. A predetermined physiological property corresponding to neural activity in the identified region is compared to the physiological property measured, in order to ensure that the method 300 is working as planned. If the measured physiological property behaves according to a correct physiological response (i.e. the physiological response known to occur for a state of activity/inactivity of the identified region/network), the method 300 is being properly applied. If the measured physiological property does not behave according to the correct physiological response for the identified region/network, chances are that the method 300 is not being properly applied, and the method is interrupted, in order to find out why. Such physiological measurements can therefore be used as additional data and parameters that may be used for the improvement of the prediction of the state of activity of identified region.

Figure 5:
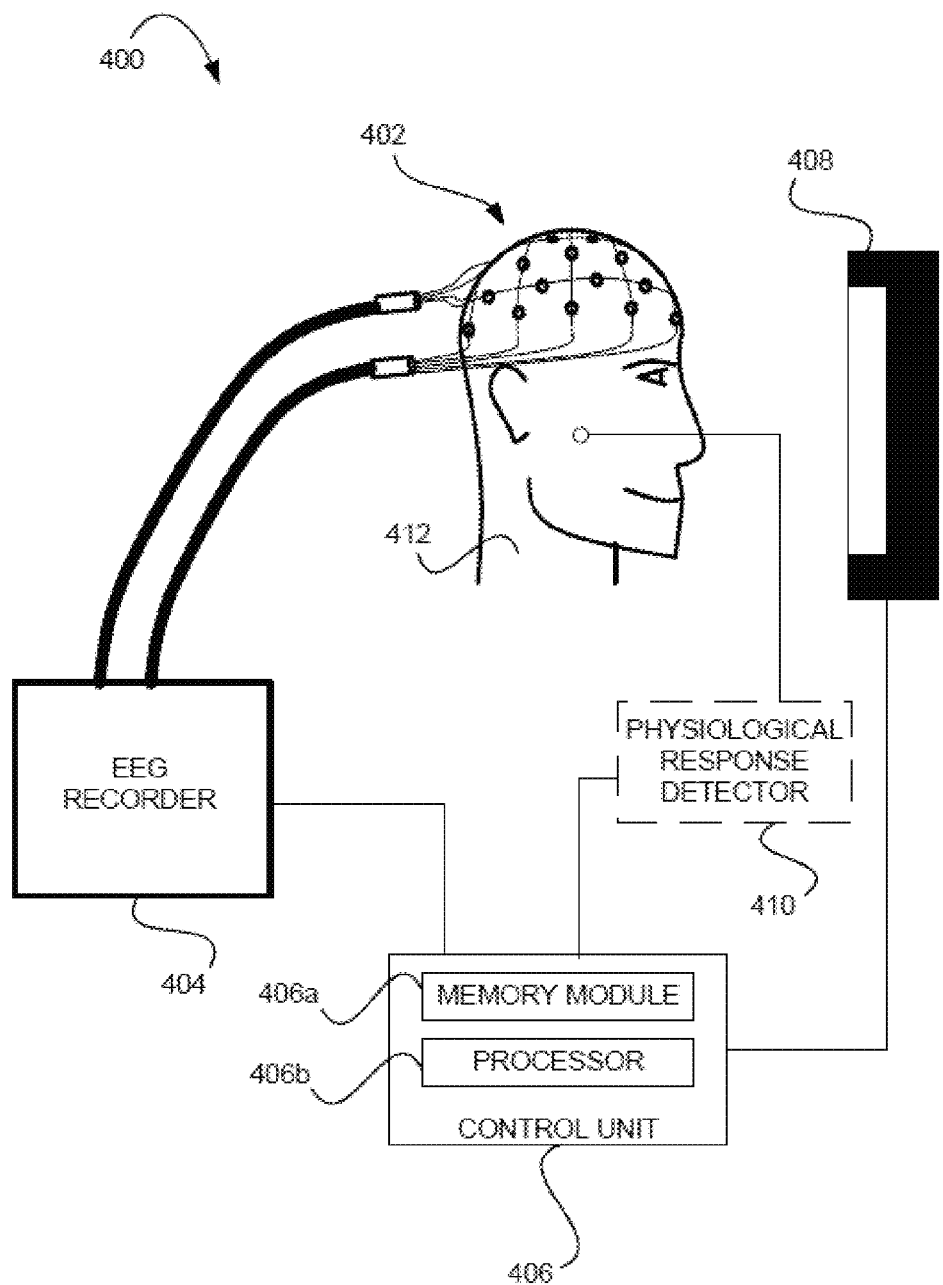
FIG. 5 is a schematic drawing illustrating an EEG-based system of the present invention for performing a NF session.

FIG. 5 is a schematic drawing illustrating an EEG-based system 400 for use in performing a NF session. The system 400 may be configured for being used after a signature has been determined, according to the above-described method of FIGS. 1A and 1B and/or via the system 200 of FIG. 3.

The system 400 includes an EEG measurement unit 402, a control unit 406 comprising a memory utility 406a for storing data and data processor 406b for processing data. The EEG measurement unit 402 is configured for placing on a scalp of a subject and for detecting electrical signals originated by neural activity of a subject's brain, and generating EEG data thereof. To this end, the EEG measurement unit 402 is associated with an EEG recorder 404. The memory utility 406a is configured for storage of a predetermined EEG signature indicative of spatial neural activation of one or more regions in a subject brain corresponding to individual functions of the brain. As indicated above, the EEG signature corresponds to a predicted response of subject's brain activity to at least one certain stimulus. The data processor 406b is configured and operable for receiving the EEG data and for processing the EEG data utilizing stored data about the predetermined EEG signature to identify one or more parameters corresponding to neural activation of one or more region for a given stimulus applied to a specific subject during the EEG measurements. The control unit 406 controls and optionally synchronizes an operation of each of the above elements of the system 400, according to predetermined commands. Such commands may be fixed, or the control unit 406 may be programmable, so that the commands are changeable by a user, according to the user's need.

In some embodiments, the system 400 comprises an output interface 408 configured for conveying a feedback message to a subject in real time indicating success or failure of the subject to provide a desired response to a given stimulus, according to a signal generated by the control unit such that the subject is trained to regulate the neural activity of the region via the feedback message. The subject 412 is asked to achieve a desired modulation of the subject's brain. The EEG data is sent to the control unit 406. The EEG measurement may be made continuously starting before the instruction to the subject and ending at a predetermined time after the instruction has been made to the subject 412, as explained before, with reference to step 304 of FIG. 4. In one variant, the beginning and end of the measurement period are selected by a user (e.g. medical personnel) via an input interface (such as a keyboard or a button, or a voice activated device). In another variant, the instruction is given to the subject 412 via the output interface 408, and the control unit 406 controls the timing of the EEG measurement period, as well as the timing of the instruction within the EEG measurement period. Optionally, the control unit 406 is programmable by a user, enabling the user to determine the EEG measurement period and the timing of the instructions to the subject 412.

Optionally, the system 400 comprises a physiological property detector 410 for detecting a physiological response (i.e., property change) associated with a change of neural activity at a specific region or network in the subject's brain. Measurements effected by the physiological property detector 410 are also sent to the control unit 406.

In some embodiments of the present invention, the control unit 406 is configured and operable for performing the internal check subprocess. In such embodiments, the map constructed via the method 100 (relating EEG signatures to neural activity in regions/networks in the brain) and a map relating physiological reactions to neural activity in regions/networks in the brain is stored in the memory module of the control unit 406.

The system 400 is able to indicate the region or network in the subject's brain in which neural activity is found, via an analysis of the EEG data. The system 400, therefore, includes the benefits of spatial scanners (fMRI, MEG scanners, for example) without a need thereof. The lack of expensive and bulky spatial scanners enables the system 400 to be smaller in size than the current NF systems, and therefore to be located in small clinics or even be portable for use on the field. The system 400 provides a novel EEG-based clinical tool being portable, easy to use and low cost. NF sessions are therefore no longer limited to hospitals or research centers. Furthermore, because of the lack of high magnetic fields typically generated by spatial scanners, a need for removing and/or reducing induction artifacts from EEG measurements is reduced. The system 400 is based on (portable) EEG only, and has both diagnostic and therapeutic capabilities. The system 400 may be used for early diagnosis of vulnerability to psychopathology as well as for individually-tailored intervention and prevention protocols aimed at improving brain cognitive regulation abilities. The system 400 used with NF procedures targeted at deep brain areas and guided by the neural activation index generated by the control unit 406 improves the individual's ability to regulate specific brain functions.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for use in monitoring activity of an Amygdala brain region of a subject without spatial scan data measured from said subject, the system comprising a control unit comprising:

a memory which stores at least one brain activation signature in a form of a function describing a subset selection of frequency, time data and measurement locations which represents a correlation between high temporal resolution EEG data and fMRI spatial scan data of said Amygdala brain region acquired simultaneously during activation of said Amygdala brain region, wherein said at least one brain activation signature is sufficient for indicating activation of said Amygdala brain region without additional spatial scan data, and wherein said at least one brain activation signature is a model of said fMRI spatial scan data of an activated Amygdala brain region;

a data input utility configured to receive a set of measured EEG temporal data comprising data corresponding to signals measured by one or more electrodes from one or more regions in a subject brain; and a processor configured to process the set of measured data and said at least one stored brain activation signature and to identify one or more parameters representing neural activation of the Amygdala brain region in said subject brain;

wherein said processor is configured to identify said one or more parameters without the use of spatial scan data.

2. The system of claim 1, wherein the set of measured EEG temporal data comprises electrical data measured by one or more electrodes located on the subject's scalp.

3. The system of claim 1, wherein said processor is configured to use said stored at least one brain activation signature and said set of measured EEG temporal data for interpretation of a brain functional state of said Amygdala brain region in said subject brain using said identified one or more parameters, and to provide a feedback signal to said subject based on said interpretation.

4. A system according to claim 1, wherein said processor utility is configured to select signals related to the neuronal activation of said Amygdala brain region from the set of measured EEG temporal data, and extract modulation of said Amygdala brain region based on the selected signals.

5. A system according to claim 4, wherein said extracted modulation is modulation of limbic activity of said Amygdala brain region.

6. A system according to claim 1, wherein said system is used in monitoring activity of a network of brain regions comprising said Amygdala brain region.

7. A system according to claim 1, wherein said system is used for monitoring activity of said Amygdala brain region of a subject diagnosed with post-traumatic stress disorder (PTSD) during neurofeedback (NF) in said subject, wherein said memory stores a NF protocol for training said subject to modulate activity of said Amygdala brain region, and wherein said processor is configured to perform said NF protocol.

8. A system according to claim 7, wherein said NF protocol comprises a protocol of an anxiety-decreasing NF technique.

9. The system of claim 1, wherein said received set of measured EEG temporal data comprises data corresponding to signals originated by neural activity of said subject brain following at least one stimulus configured to stimulate a stress-related network.

10. The system of claim 9, comprising:
an output interface configured to generate at least one feedback message to said subject;
and wherein said processor is configured to signal said output interface to convey a feedback message to said subject indicating success or failure of said subject to provide a desired response to said stimulus, based on said identified one or more parameters.

11. The system of claim 1, the system further comprising:
a measurement device connected to said data input utility and configured and operable for measuring said set of measured EEG temporal data.

12. The system of claim 11, wherein said measurement device comprising:
an EEG electrode arrangement configured for placing on a scalp of the subject and detecting one or more electrical signals originated by neural activity of a subject's brain, and for generating EEG data from the neural activity.

13. A system according to claim 1, when said system is used in monitoring activity of said Amygdala brain region during neurofeedback (NF) in a subject, wherein said memory stores a NF protocol for training said subject to modulate activity of said Amygdala brain region.

14. A system according to claim 13, wherein said subject is diagnosed with post-traumatic stress disorder (PTSD).

15. A system for use in monitoring activity of a brain target of a subject without spatial scan data measured from said subject, the system comprising a control unit comprising:
a memory which stores at least one brain activation signature in a form of a function describing a subset selection of frequency, time data and measurement locations which represents a correlation between high temporal resolution EEG data and fMRI spatial scan data of said brain target acquired simultaneously during activation of said brain target, wherein said at least one brain activation signature is sufficient for indicating activation of said brain target without additional spatial scan data, and wherein said at least one brain activation signature is a model of said fMRI spatial scan data of said brain target when said brain target is activated, wherein said brain target comprises one or more brain regions or a network of brain regions;
a data input utility configured to receive a set of measured EEG temporal data comprising data corresponding to signals measured by one or more electrodes from one or more regions in a subject brain; and
a processor configured to process the set of measured data and said at least one stored brain activation signature and to identify one or more parameters representing neural activation of the brain target in said subject brain;
wherein said processor is configured to identify said one or more parameters without the use of spatial scan data.

16. A system according to claim 15, wherein said brain target comprises one or more regions or a network of regions involved in a stress disorder or in trauma situations.

17. A system according to claim 15, wherein said brain target comprises an Amygdala brain region.

18. A system according to claim 15, wherein said brain target comprises one or more limbic regions.

19. A system according to claim 15, wherein said system is used for monitoring activity of said brain target of a subject diagnosed with a stress disorder during neurofeedback (NF) in said subject, wherein said memory stores a NF protocol for training said subject to modulate activity of said brain target, and wherein said processor is configured to perform said NF protocol.

20. A method for use in monitoring activity of an Amygdala brain region of a subject diagnosed with PTSD using the device of claim 1 and during neurofeedback (NF), comprising:
providing to said input data utility of said device during said NF said set of measured EEG temporal data comprising data corresponding to signals measured by one or more electrodes from one or more regions of a subject brain;
processing during said NF by said processor of said device the set of measured EEG temporal data using said at least one brain activation signature stored in said memory of said device and identifying one or more parameters representing neural activation of said Amygdala brain region in said subject brain,
wherein said at least one brain activation signature describes indications of activation of said Amygdala brain region, and wherein said NF is configured to train said subject to modulate activity of said Amygdala brain region.

21. The method of claim 20, comprising:
delivering using an output interface of said system a feedback signal to said subject, wherein said feedback signal is related to the identified neural activation of the Amygdala brain region in said subject.

22. The method of claim 20, wherein the set of measured EEG temporal data correlates with measurements of electrical activity along the subject's scalp obtained from a matrix of electrodes at multiple locations.

23. The method of claim 21, further comprising applying one or more stimuli to the subject such that the set of measured EEG temporal data corresponds to the subject's brain response to said certain one or more stimuli.

24. The method of claim 23, wherein said delivering comprises delivering said feedback signal to said subject indicating success or failure of the subject to provide a desired response to said stimulus, based on the results of said processing.

* * * * *